(12) United States Patent
Garnett et al.

(10) Patent No.: US 7,209,358 B2
(45) Date of Patent: Apr. 24, 2007

(54) AGGREGATION SWITCH

(75) Inventors: Paul J. Garnett, Camberley (GB); Martin P. Mayhead, Hindhead (GB); Thomas E. Giles, Union City, CA (US); Ariel Hendel, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 389 days.

(21) Appl. No.: 10/653,029

(22) Filed: Aug. 29, 2003

(65) Prior Publication Data

US 2005/0047098 A1  Mar. 3, 2005

(51) Int. Cl.
*H05K 7/00* (2006.01)
*H04M 5/00* (2006.01)

(52) U.S. Cl. ...................... 361/735; 379/330

(58) Field of Classification Search .............. 361/788, 361/803, 733, 730; 710/301, 110, 316; 257/686, 257/723; 379/330, 319–324
See application file for complete search history.

(56) References Cited

U.S. PATENT DOCUMENTS

| | | | |
|---|---|---|---|
| 5,317,477 A * | 5/1994 | Gillett ..................... 361/683 |
| 5,352,123 A * | 10/1994 | Sample et al. ............. 439/61 |
| 5,577,032 A | 11/1996 | Sone et al. |
| 5,655,120 A | 8/1997 | Witte et al. |
| 6,085,238 A * | 7/2000 | Yuasa et al. ............. 709/223 |
| 6,247,078 B1 | 6/2001 | Ebert et al. |
| 6,452,809 B1 | 9/2002 | Jackson et al. |
| 6,505,254 B1 | 1/2003 | Johnson et al. |
| 6,556,438 B1 | 4/2003 | Bolognia et al. |
| 6,560,606 B1 | 5/2003 | Young |
| 6,583,989 B1 | 6/2003 | Guyer et al. |
| 6,594,150 B2 | 7/2003 | Creason et al. |
| 6,628,525 B2 * | 9/2003 | Miller et al. .............. 361/756 |
| 6,643,141 B2 * | 11/2003 | Kaetsu et al. ............. 361/797 |
| 6,654,252 B2 | 11/2003 | Raynham |
| 6,680,904 B1 * | 1/2004 | Kaplan et al. ............ 370/217 |
| 6,711,028 B2 * | 3/2004 | Iny ......................... 361/788 |
| 6,721,794 B2 | 4/2004 | Taylor et al. |
| 6,742,068 B2 | 5/2004 | Gallagher et al. |
| 6,745,286 B2 | 6/2004 | Staub et al. |
| 6,782,531 B2 | 8/2004 | Young |
| 6,816,905 B1 * | 11/2004 | Sheets et al. ............. 709/226 |
| 6,922,342 B2 * | 7/2005 | Doblar et al. ............. 361/736 |
| 6,930,890 B1 * | 8/2005 | Branscomb ............... 361/788 |
| 6,968,394 B1 * | 11/2005 | El-Rafie .................. 709/245 |
| 6,970,434 B1 * | 11/2005 | Mahany et al. ........... 370/256 |
| 2002/0107990 A1 | 8/2002 | Johnson et al. |
| 2002/0120741 A1 | 8/2002 | Webb et al. |
| 2002/0124114 A1 | 9/2002 | Bottom et al. |

(Continued)

*Primary Examiner*—Dean A. Reichard
*Assistant Examiner*—Hung Nguyen
(74) *Attorney, Agent, or Firm*—Meyertons Hood Kivlin Kowert & Goetzel, P.C.; B. Noël Kivlin

(57) ABSTRACT

A computer system comprises a plurality of shelves. Each shelf has a carrier for removably receiving a plurality of information processing modules and a switching module. Each shelf also has an interconnection member for providing connections between the information processing modules and the switching module. The shelves are logically connected into a plurality of stacks, the switching modules of the respective shelves in each stack being interconnected in a logical stacking configuration. The computer system further comprises a shelf having a carrier for removably receiving a master switching module, wherein the master switching module is connected into each stack as a common master switch for all of the stacks.

31 Claims, 16 Drawing Sheets

U.S. PATENT DOCUMENTS

2003/0033360 A1  2/2003  Garnett
2003/0105903 A1  6/2003  Garnett
2005/0063354 A1  3/2005  Garnet

* cited by examiner ered to like elements are omitted...

AGGREGATION SWITCH

BACKGROUND OF THE INVENTION

The present invention relates to distributed switching, and in particular, but not exclusively to a modular computing system with distributed switching.

One application for the present invention relates to high density computer systems, for example, computer server systems for telecommunications applications. In telecommunications applications, it is important to provide high reliability and high capacity of operation. Various approaches have been taken to providing such high-performance, high reliability systems. Typically such systems are designed around providing redundant resources so that if one component of the system develops a fault, the system remains operational using the redundant resources. Fault tolerance can also be achieved, for example, with multiprocessor systems that provide redundancy through dynamic, e.g., software-controlled, task distribution. High density systems are typically rack mountable, with one or more processor systems occupying a shelf in the rack. The trend in recent times is to make the computers with smaller form factors. This means that more computers can be located in a rack. This has the advantage of increasing the processing density within the racks, and also the advantage of reducing the distance between the computer systems.

The present invention relates to providing management and network interconnectivity for such a computer system in a space efficient manner.

SUMMARY OF THE INVENTION

Viewed from a first aspect, the present invention provides a computer system. The computer system comprises a plurality of shelves. Each shelf has a carrier for removably receiving a plurality of information processing modules and a switching module. Each shelf also has an interconnection member for providing connections between the information processing modules and the switching module. The shelves are logically connected into a plurality of stacks, the switching modules of the respective shelves in each stack being interconnected in a logical stacking configuration. The computer system further comprises a shelf having a carrier for removably receiving a master switching module. The master switching module is connected into each stack as a common master switch for all of the stacks. By this arrangement a number of physically separate computer system chassis can be interconnected to provide a computer system having greater processing capability made up of low cost processing engines with data movement within the computer system being under the control of a dedicated switching entity. Thus a flexible, scalable computer system architecture is provided.

In one embodiment, the interconnected switching modules and master switching module are operable as a single distributed switch. This arrangement provides for efficient operation of communication between the individual processing engines of the different shelves.

Viewed from another aspect the present invention provides a computer system. The computer system comprises a first plurality of modular computer systems connected in a logical stacking configuration and a second plurality of modular computer systems connected in a logical stacking configuration. The computer system further comprises an aggregation switch connected into the stacking configuration of each of the first and second pluralities of modular computer systems. Thereby a number of distinct or overlapping logical stacks of computer systems can be interconnected to form a greater capacity computer system having reliable internal interconnections using a dedicated switching entity. Thus a flexible and highly scalable architecture is provided.

Particular aspects of the invention are set out in the accompanying independent claims. Features from the dependent and/or independent claims may be combined as appropriate and not merely as set out in the claims.

BRIEF DESCRIPTION OF THE FIGURES

Embodiments of the present invention will be described hereinafter, by way of example only, with reference to the accompanying drawings in which like reference signs relate to like elements and in which.

Figure 1:
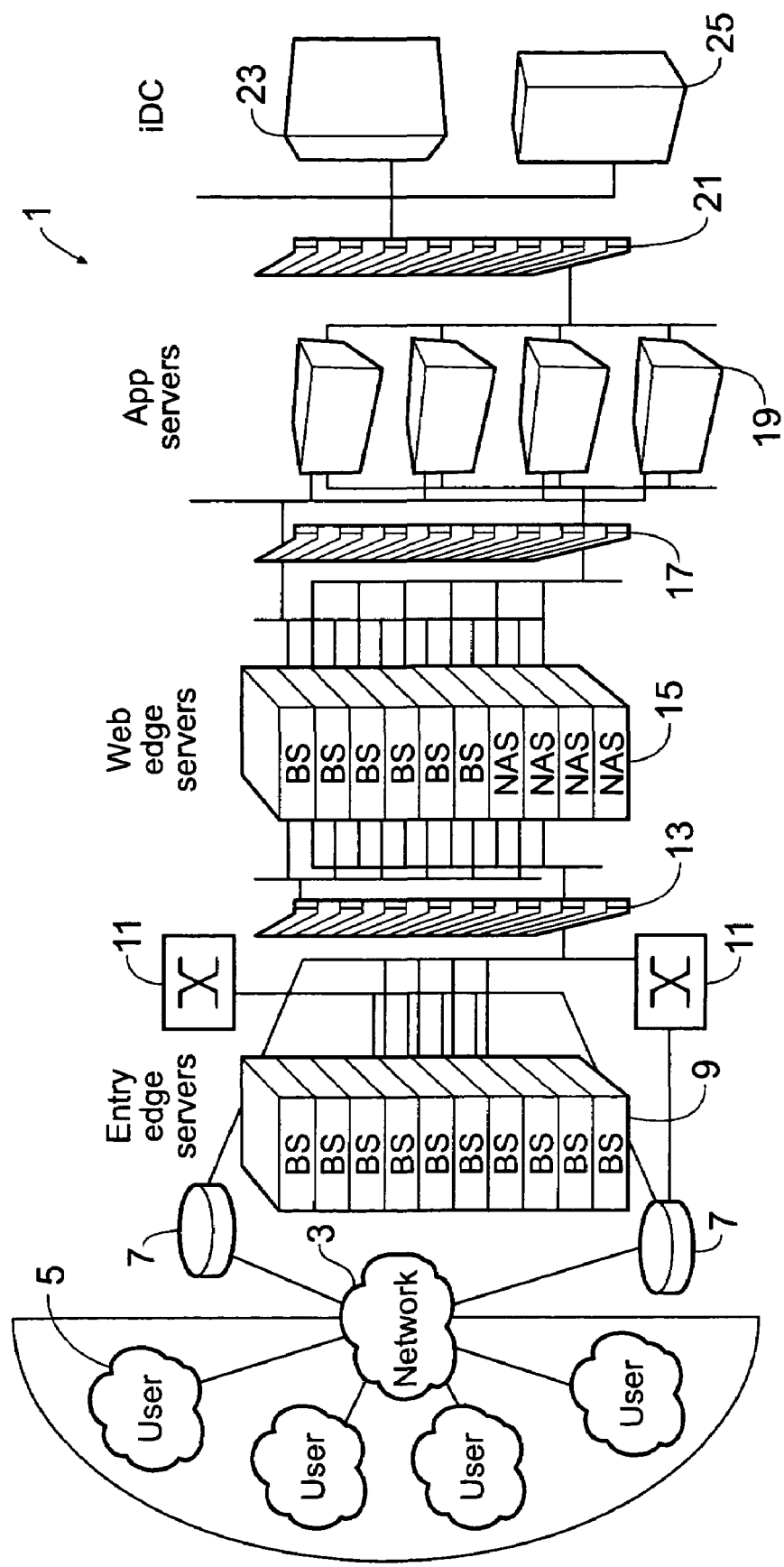
FIG. 1 is a schematic representation of an architecture of a multiprocessor system for supporting a web site.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF PARTICULAR EMBODIMENTS

Embodiments and examples are described hereafter by way of example only in the following with reference to the accompanying drawings.

Shown in FIG. 1 is an example of an application of a high capacity multiserver system 1 for implementing a network-connected web site such as, for example, an airline reservation system on the World Wide Web.

As shown in FIG. 1, an external network 3 (e.g., the Internet) for communicating with a user 5 can be connected to gateways 7 which can be connected to an entry edge server group 9 implemented by a web farm. The entry edge server group 9 forms an interface to the external network 3. The entry edge server group 9 can then be connected by switches 11 and a firewall 13 to a web edge server group 15 that can also be implemented as a web farm as shown in FIG. 1. The web edge server group 15 can serve to cache web pages that are readily accessible to users 5 accessing the system 1 from the external network 3, for example for checking flight times, etc. The web edge server group can comprise a number of blade server (BS) shelves and a number of network addressable storage (NAS) shelves for storing critical data. Communications between the blade server shelves may be controlled using a master switch shelf (MS). The web edge server group 15 can be further connected by a further firewall 17 to a plurality of application servers 19, which can be responsible for, for example, processing flight reservations. The application servers 19 can then be connected via a further firewall 21 to computer systems 23, 25, for example, e-commerce services including financial services for receiving and processing payment for airline reservations.

As will be appreciated, the server system described above with reference to FIG. 1 is only an example of a possible application for a multiprocessor server system. Multiprocessor server systems have many different applications and the present system is not limited to being applicable for use in only one or a limited number of such applications, rather multiprocessor server systems as described herein are operable for use in many different applications. A non-exhaustive list of such alternative applications includes: e-commerce web server systems; telecommunications network server systems; LAN application and file server systems and remote vehicle control systems.

Figure 2:
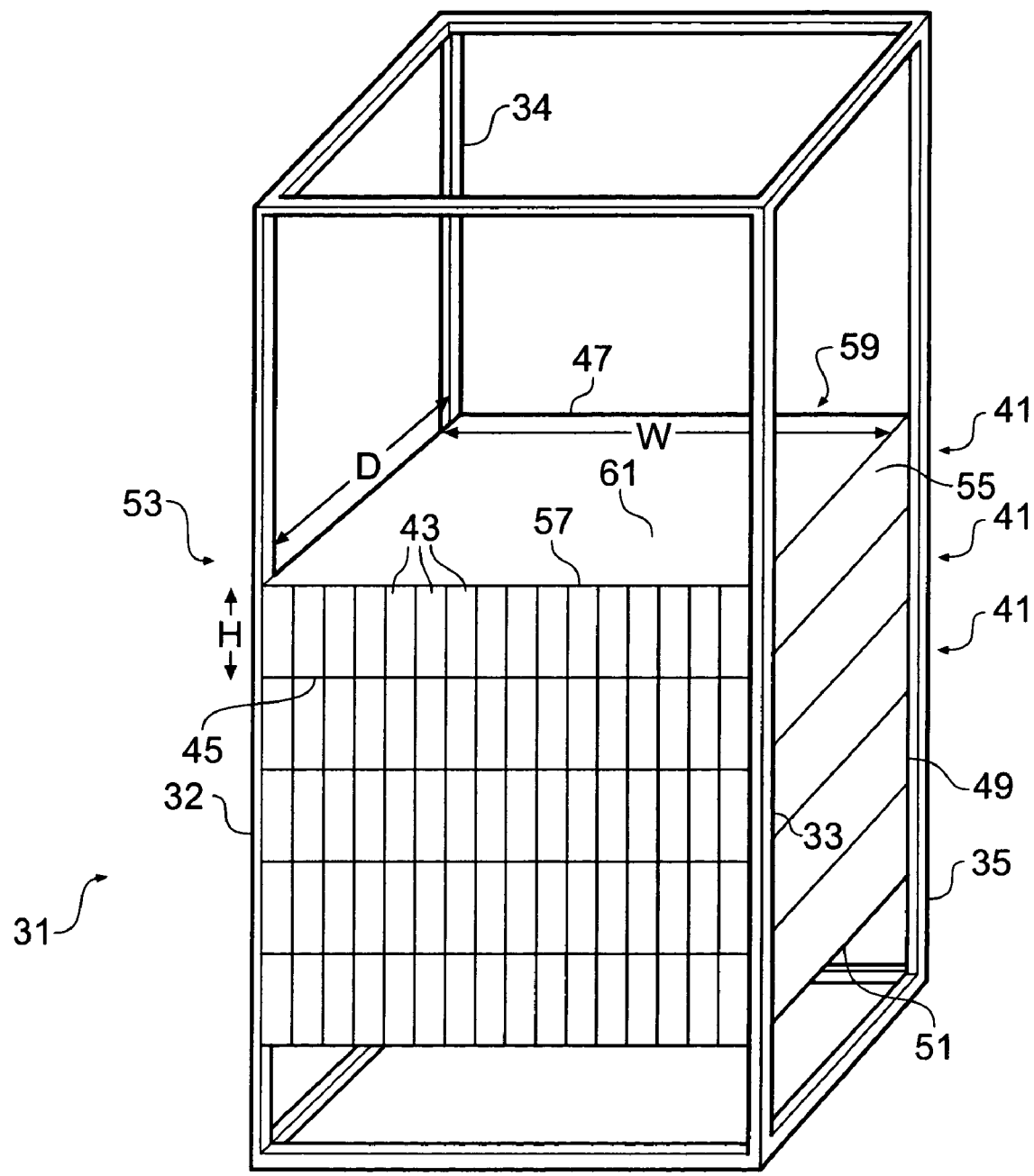
FIG. 2 is a schematic representation of a racking system incorporating an example of a carrier in the form of a rack-mountable shelf according to a first example.

With reference to FIG. 2, there is shown a schematic perspective representation of a rack system 31 as viewed from the front including left and right front uprights 32 and 33 and left and right rear uprights 34 and 35. The uprights can be formed with apertures for receiving shelf fixings (e.g., screws, bolts, clips, etc., for mounting brackets, slides, rails, etc.).

Also shown in FIG. 2 are examples of several blade server shelves 41 mounted in the rack system 31. Each shelf 41 forms a carrier configured to carry a plurality of information processing cartridges 43 located side by side along the shelf.

The term "shelf" is used herein in a conventional way to describe a structure that is mountable in rack system 31 and is configured to carry one or more components to form at least a part of a rack mountable system. In the present example, the shelf 41 is three-dimensional, having a height (H), width (W) and depth, (D). In the present example, one dimension (hereinafter described as the height, H) is smaller than the other dimensions (hereinafter described as the depth, D, and the width, W) to facilitate mounting of the shelf within the rack system 31. It will be appreciated that although the width and depth are typically constrained by the dimensions of the racking system for which the shelf is designed, there is more freedom as regard the height, subject to taking account of any appropriate standards and packaging considerations.

Each of the information processing cartridges contains at least one processor. Each information processing cartridge in the present example is operable as a server. In the described examples, the information processing cartridges are configured as robust enclosed modules.

In the example to be described in more detail presently, the information processing cartridges, when aligned in the carrier shelf, look like rectangular slabs, or blades. Accordingly, an information processing cartridge can be described as a blade. The information processing cartridges 43 comprise information processing modules enclosed in an enclosure, or housing, so that the information processing modules have the form of cartridges. Also, as the information processing cartridges are to operate as computer servers in the example described in more detail presently, an information processing cartridge 43 can also be described as a server blade. Accordingly, in the context of this example, the terms module, cartridge and blade are used interchangeably.

The illustrated example of a shelf 41 is configured to carry sixteen information processing cartridges 43, each of which is removably mountable in a respective opening 45 in the front of the shelf, whereby the information processing cartridges can be inserted into and removed from the front of the shelf 41 without removing the shelf 41 from the rack system 31.

In the present example, the shelf 41 comprises a three-dimensional, generally rectangular, enclosure, or housing, 47 that is suitable for mounting in generic racking systems including both 4-post and 2-post systems. It can be mounted on fixed rigid rack mounting ears and/or a simple slide/support system. The present example is designed for standard 19"-wide racking (1"=25.4 mm) as defined, for example, in the well-known IEC297 and EIA310 specification standards with height corresponding to the so-called 3U (3 standard unit) height. For mounting such a 3U unit in such a 19"-wide racking system, with a depth of, say 25" or 30", the enclosure can be arranged with a height of up to about 130.5 mm, a width of up to about 445 mm and a depth, including all hardware and fascias, but excluding cable management, of up to about 635 mm, with the depth from the front-most point of a fascia to a rear I/O connector panel of a rear mounted Field Replaceable Unit (FRU) of about 610 mm. Of course, other examples designed for other racking systems could have different dimensions.

This example of a shelf 41 has a single enclosure, or housing, 47 that houses a number of modular units or subsystems, the majority of which are replaceable in the field and are therefore known as Field Replaceable Units (FRUs). These modular units include the information processing cartridges 43.

The shelf enclosure 47 can be fabricated from sheet material (e.g., from steel sheet) to form a chassis portion 49 that includes a base 51, two sides 53 and 55, a front 57 and a rear 59. The word "front" as used here is merely used as a label herein to refer to the face, or wall 57 of the enclosure that is located at the main access side of the rack system 31 in use when the shelf is mounted therein. Similarly, the words "rear" and "side" are merely used as labels herein to refer to the faces, or walls 59, 53 and 55 that, in use, are located at those respective positions when the shelf is mounted in the rack system 31.

The openings 45 can be formed in the front face 57 for receiving the information processing cartridges 43 and, as will be explained later, apertures can also be formed in the rear face 59 for receiving further FRUs. The enclosure can further include a removable top cover 61 that can be secured to the chassis portion 49 by suitable fastening (e.g., screws). The apertures in the front and rear faces 57 and 59 allow at least some of the FRUs to be inserted into and/or removed from the shelf enclosure 47 via the front or the rear thereof, as appropriate, without removing the shelf from the racking. Access to components mounted in the shelf that are not accessible via one of the apertures in the front 47 and rear 59 faces can be achieved by removing the shelf enclosure 47 from the racking system 31 and then removing the top cover 61 of the shelf enclosure 47.

In the present example, the shelf 41 is configured to receive a plurality of information processing cartridges 43 at the front face of the housing 47. The shelf 41 of the present example is further configured to receive a pair of power supply field replaceable units (PSUs) 81 and a pair of combined switch and service processor field replaceable units (CSSPs) 71 at the rear face of the housing 47. The CSSPs 71 of the example provide both switching and management (service processor) facilities for the information processing cartridges 43 received in the shelf 41. The PSUs 81 provide power to the shelf 41 and modules received therein. In the present example redundancy of support modules is provided, that is to say each PSU 81 is independently capable of providing power to each of the maximum number of information processing cartridges 41 receivable within the housing 47 and to each of the CSSPs 71. In addition, each CSSP 71 is independently operable to provide data switching and management services for each of the maximum number of information processing cartridges 41 receivable within the housing 47 and management services to each of the PSUs 81.

Examples and description of a computer system shelf 41 and various field replaceable modules for use therewith are to be found in published U.S. patent application Ser. No. 10/171,809 filed 14 Jun. 2002, publication serial number US2003/0030988 (corresponding International Patent Application publication number (WO 03/014893). Examples and description of a field replaceable unit for providing data switching services for blades received within a computer system shelf 41 are to be found in published U.S. patent application Ser. No. 10/171,794 filed 14 Jun. 2002, publication serial number US2003/0033360. Each of those documents are hereby incorporated herein by reference.

The internal configuration of the shelf 41 and a midplane 171 contained therein is described in the following with reference to FIGS. 3A, 3B 3C and 3D, and FIGS. 4A, 4B and 4C.

Figure 3A:
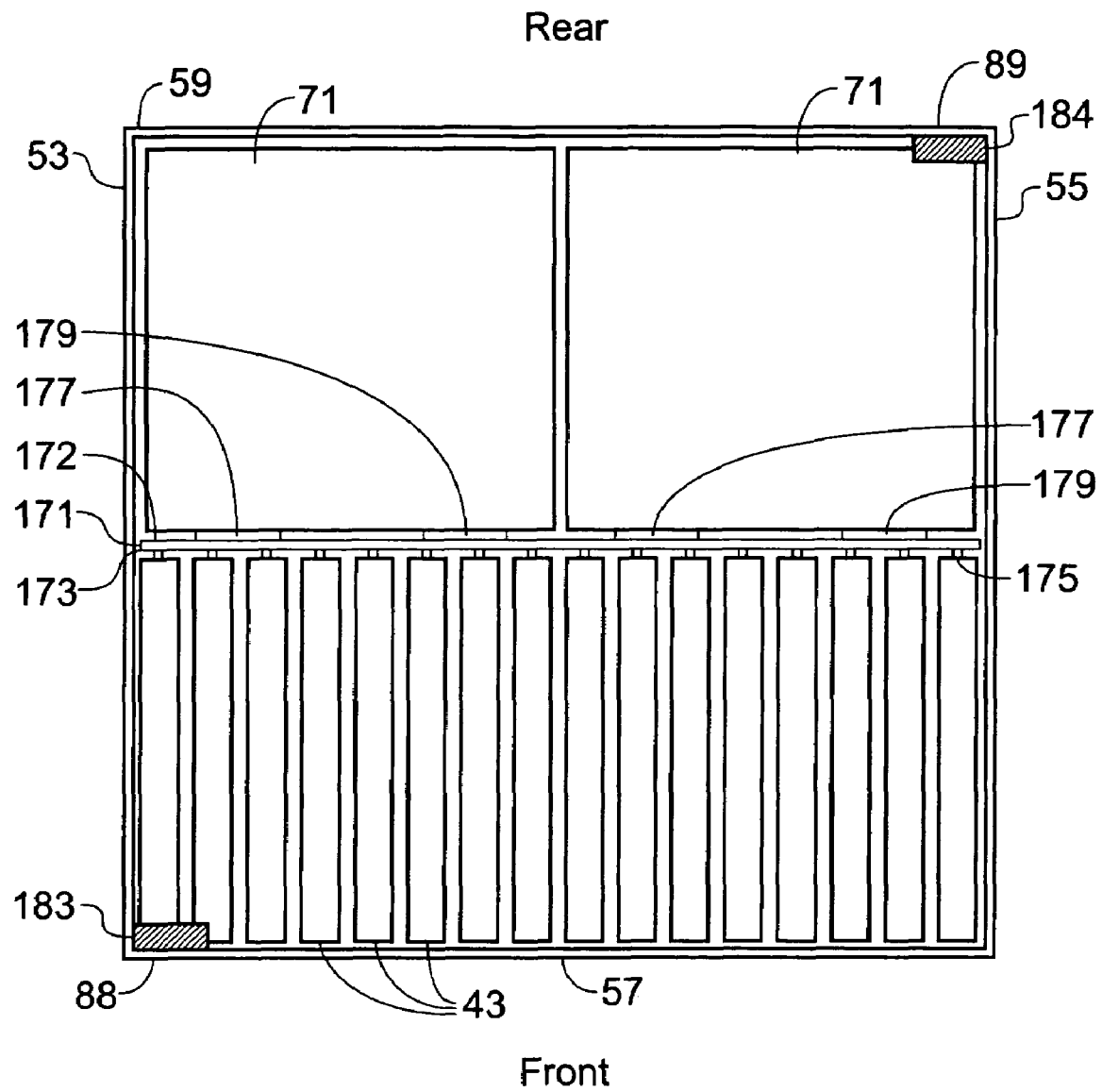
FIGS. 3A, 3B and 3C are a schematic plan view and schematic perspective views, respectively, of an example of the chassis and midplane of the shelf of FIG. 2.
Figure 3B:
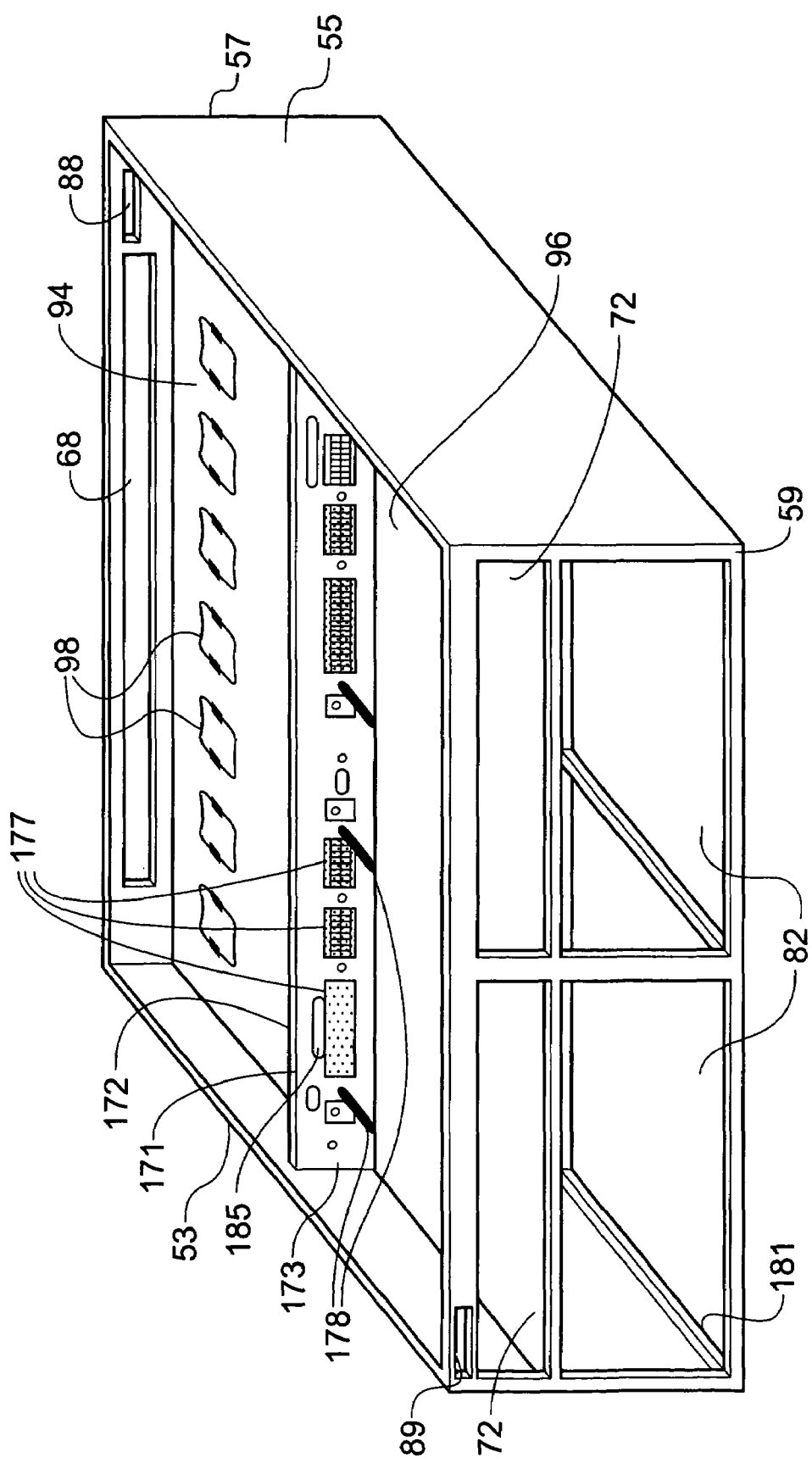
Figure 3C:
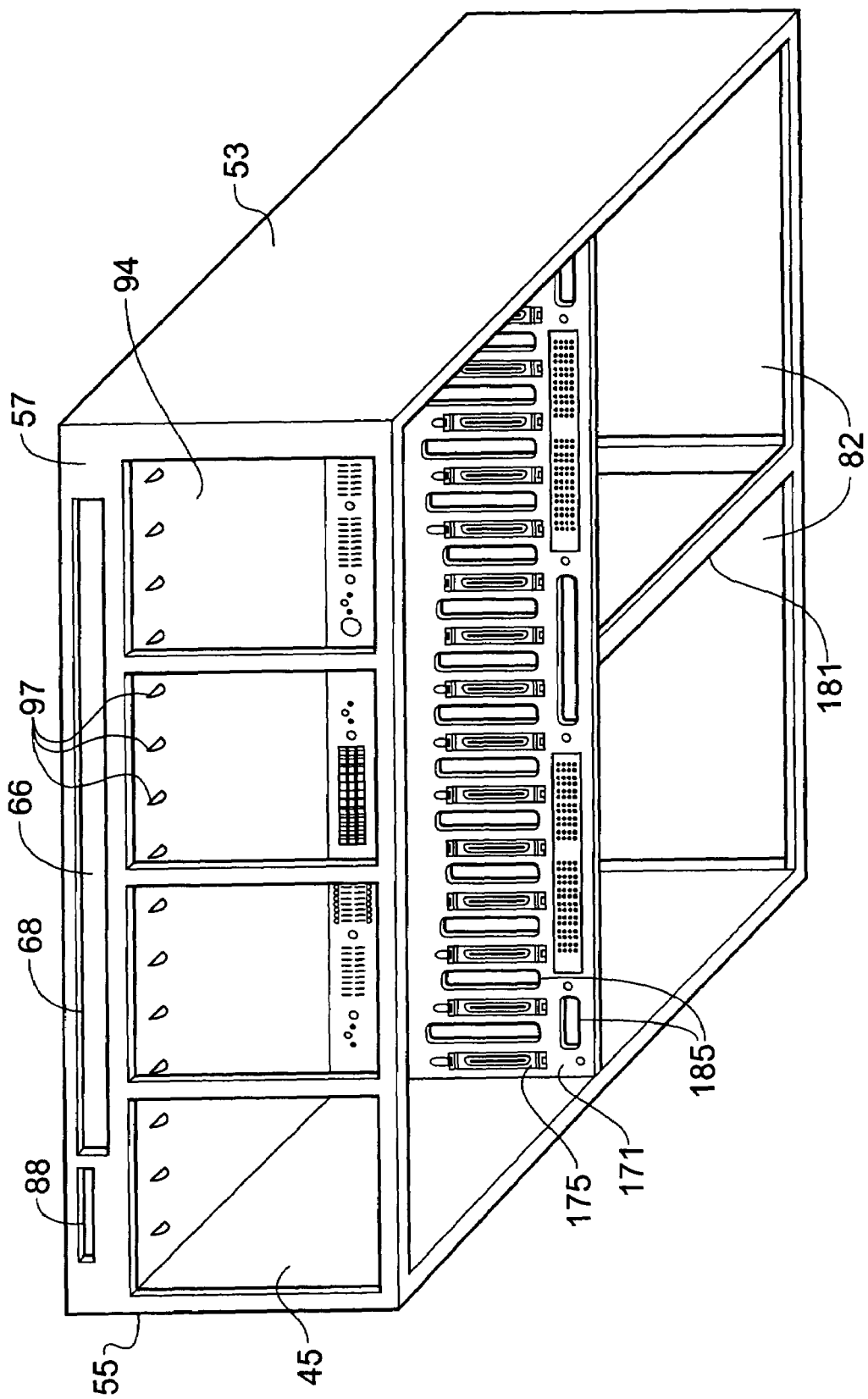
Figure 3D:
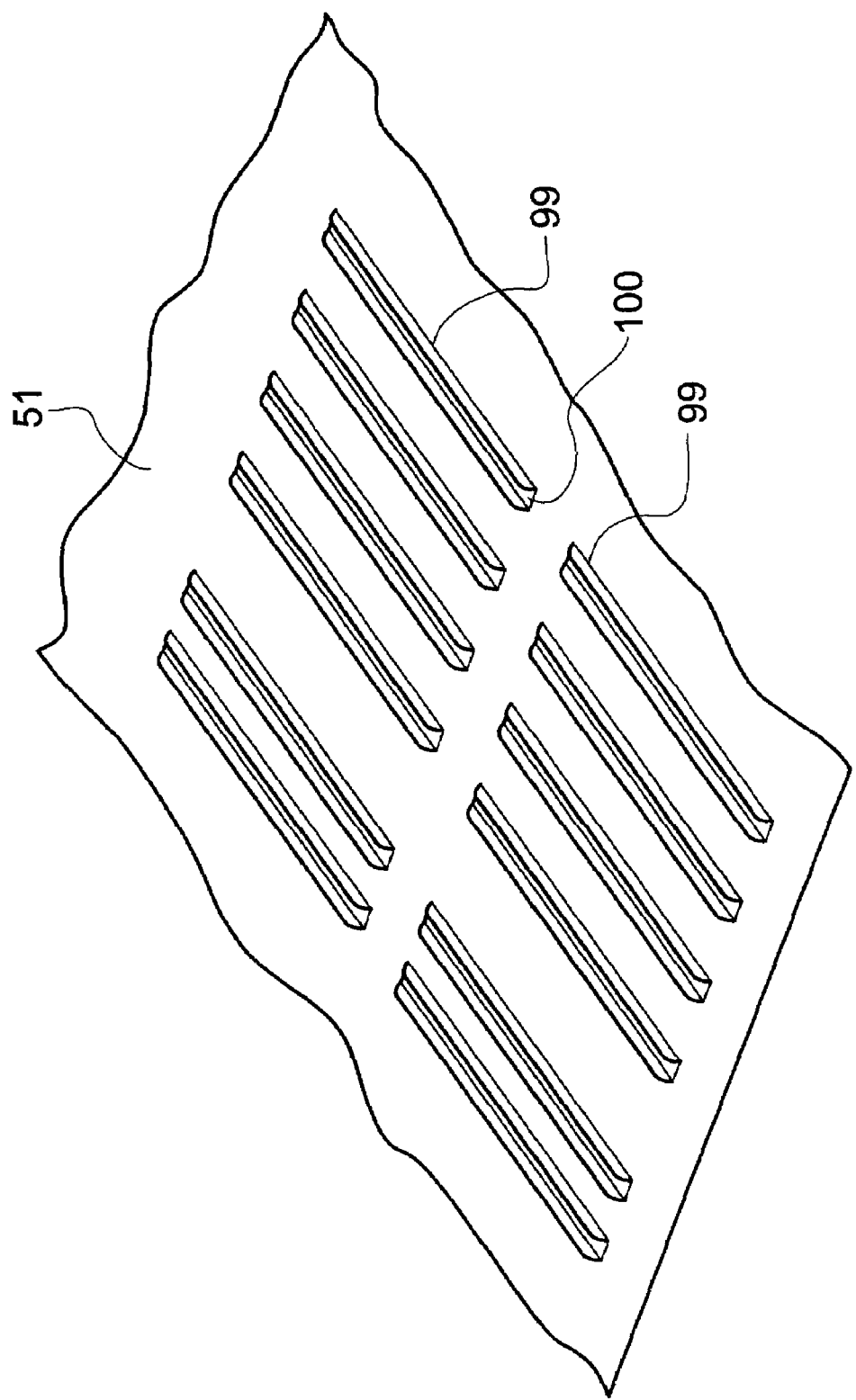
FIG. 3D is a schematic perspective view of a part of a base member of the shelf of FIG. 2.
Figures 4A, 4B, 4C:
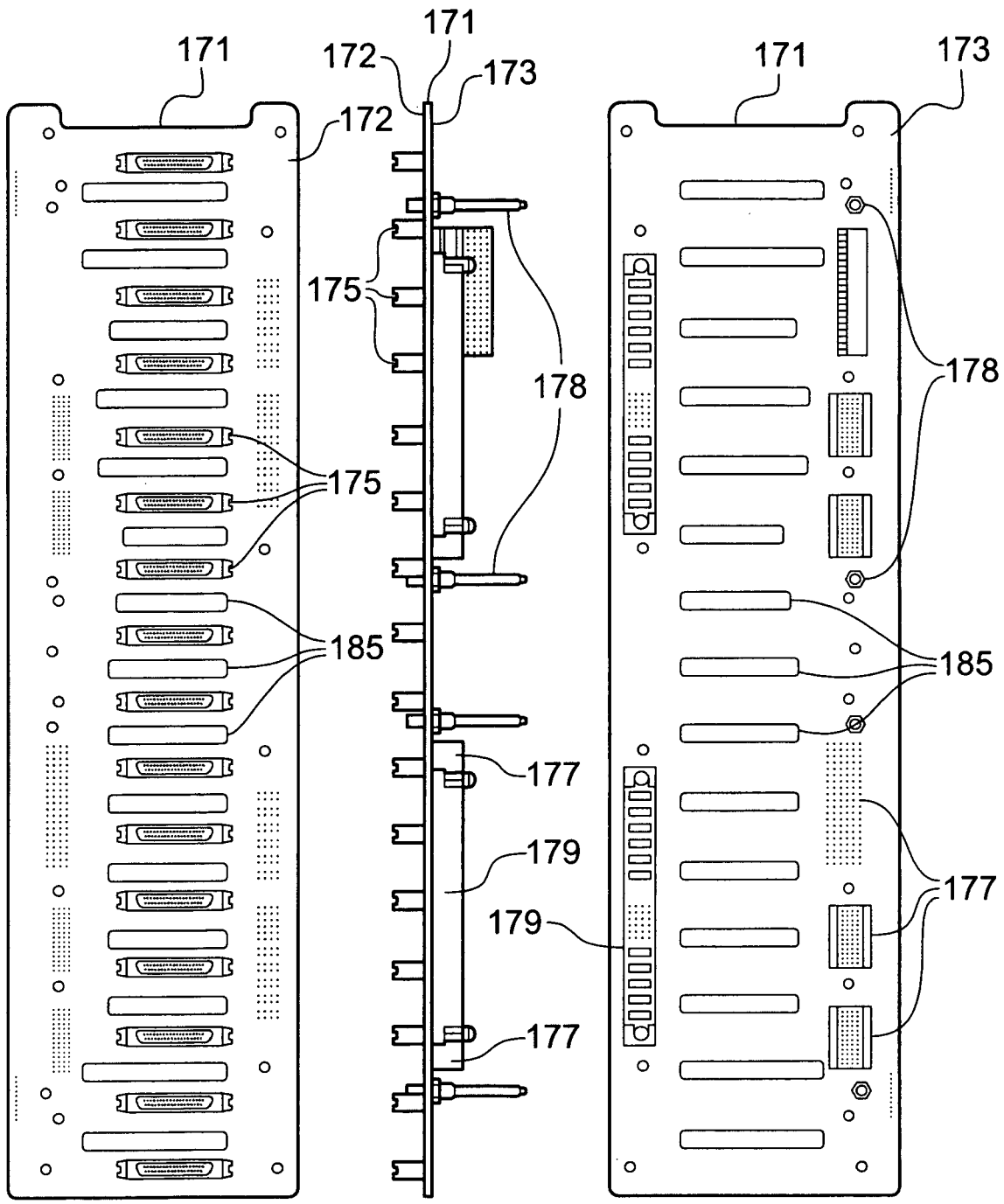
FIGS. 4A, 4B and 4C are schematic front, top and rear views, respectively, of an example of a midplane of the shelf of FIG. 2.

FIG. 3A is a schematic plan view showing the internal configuration of an example of a shelf 41 with the cover 61 removed. FIG. 3B is a schematic perspective view from above the rear of the chassis portion 47 of the shelf enclosure with the field replaceable units removed. FIG. 3C is a schematic perspective view from below the front of the chassis portion 47 of the shelf enclosure with the field replaceable units and the base 51 removed. FIG. 3D is a schematic perspective view from the front and above a part of the base 51 of the shelf 41. FIGS. 4A, 4B and 4C are, respectively, front, top and rear views of the midplane 171. In this example, the midplane is, in use, mounted vertically within the shelf 41 extending across the width W of the shelf 41 at a position approximately half way between the front and the rear of the shelf 41.

The vertically mounted midplane 171 extends, in this example, across the shelf 41 and allows for the electrical interconnection of the FRUs. The various apertures in the front and rear faces 57 and 59 of the shelf 41, in combination with the midplane 171, can be provided with guides (e.g., rails 181) and keying e.g., offset connector positioning for the insertion of the FRUs into the enclosure and midplane 171. The midplane 171 can be a double-sided, or multi-layer printed circuit board (PCB) assembly that can be mounted vertically in a rigid manner within the enclosure. It can carry connectors 175 on a front surface 172 for making electrical connection with corresponding connectors 120 on the information processing cartridges 43. It can also carry connectors 177 and 179 on rear surface 173 for making electrical connection with corresponding connectors 141 and 163 on the CSSPs 71 and the PSUs 81, respectively. Conductive tracks (not shown) on and through the midplane 171 can be provided to interconnect the various connectors. In addition, the midplane can provide connectors for receiving corresponding connectors connected to first and second indicator boards 183 and 184 that each carry a respective set of LED indicators 69. In the present example, the midplane 171 is not configured as a FRU and is not hot swappable. It is perforated to facilitate airflow through the shelf 41. The midplane 171 can include openings 185, which co-operate with openings in the enclosures of the FRUs 43 and 81, to provide a path for cooling air to pass from the front to the rear of the shelf 41, the cooling air being driven by fans in one or more of the FRUs, for example in the PSUs 81, possibly also in the information processing cartridges 43.

A plenum chamber floor member 94 can extend horizontally from the front of the midplane 171 to the front face 57 of the shelf enclosure, or chassis 47. The member 94 provides a floor for a plenum chamber 66, which is supplied with air via the apertures 65 in the front bezel and, in the illustrated example, the slot shaped aperture 68 in the front face 57 of the shelf enclosure 47. Although, for reasons of ease of illustration a slot shaped aperture 68 is shown, a plurality of apertures 68 aligned with the blade receiving locations may be provided. The aperture or apertures 68 can serve both as air vents for a flow of air to the plenum chamber 66, and also as latching locations for latching portions of, for example, injector/ejector levers of processing cartridges 43 to be received within the shelf 41. The top and sides of the plenum chamber are provided by the top cover 61 and side faces 53 and 54 of the shelf enclosure 47.

A plurality of cartridge guides 97 can be provided at the underside of the plenum chamber floor member 94. In the present example, these guides comprise sprung wire members, e.g., of a resilient metal such as spring steel, that are attached to the top surface of the plenum chamber floor member 94 and extend through a plurality of apertures therethrough to result in a row of guides 97 at the underside of the plenum chamber floor member 94. This arrangement is shown in FIGS. 3B and 3C. In FIG. 3B, the sprung wire members 98 are shown attached to the top surface of the plenum chamber floor member 94. In the present example, the sprung wire members 98 are arranged in pairs, such that two guides 97 are provided by each spring clip 98. In FIG. 3C, the guides 97 formed by the protruding portions of the sprung wire members 98 are shown at the underside of the plenum chamber floor member 94. Each guide 97 is advantageously positioned so as to interface with a guide groove in the housing of a processing cartridge 43 to aid correct alignment and to facilitate insertion of the processing cartridge during insertion of the cartridge into the shelf 41. The use of the spring clip as a guide 97 also serves to urge the processing cartridge downwards to provide a secure mounting of the processing cartridge 43, to take account of manufacturing and operational tolerances and to assist in insertion of the processing cartridge where an operator does not align this absolutely correctly.

A further row of cartridge guides 99 can be provided at the upper surface of the base 51 of the shelf 41. In the present example, as shown in FIG. 3D, these guides 99 have a rail like form, which can be achieved by punching or stamping through the base 51 of the shelf 41. In this example each guide, or rail, 99 includes a pair of upstands separated by an aperture 100 through the base 51. The size of the aperture 100 can correspond to the width between the upstands. The separation of the upstands is selected so that the overall width of the resulting rails is slightly less than the width of a groove formed in the lower face of an information processing cartridge 43. Thus, each guide 97 is advantageously arranged so as to interface with a groove in the lower face 104 of a processing cartridge 43 to aid correct alignment and to facilitate insertion of the processing cartridge during insertion of the cartridge into the shelf 41.

In the present example, where the guides 97 and 99 are formed from metal, the corresponding grooves at the upper and lower faces, respectively, of each information processing cartridge 43 may be advantageously formed from or lined with a plastics material. Such an arrangement results in a combination of metal and plastics materials that can provide a low friction interaction, facilitating insertion of the information processing cartridges.

If, for example, the information processing cartridge enclosure is made of a metal, it may be undesirable to provide metal guides to avoid a metal to metal interaction. In such a case, for example, it may be desirable to form the guides from a plastics material having a low coefficient of friction, such as polytetrafluoroethene (PTFE) or polythene. Plastics rails could be attached to the underside of the plenum chamber floor member 94 and/or on the upper surface of the base 51 of the shelf 41. In such an example, grooves on the upper and lower faces of the information processing cartridges 43 could then be formed of metal or plastics and still result in a low friction arrangement.

A CSSP/PSU divider 96 can be provided to the rear of the midplane 171 and can extend horizontally to the rear face 59 of the shelf enclosure 47. The CSSPs 71, when inserted, are supported by the divider 96. To aid the correct insertion of the CSSPs 71, CSSP guide pins 178 are provided on the midplane 171 at positions adjacent connectors 177 on the midplane 171 for connection to the CSSPs 71.

Respective positions 88 and 89 can be formed in the front face 57 and the rear face 59 at which first and second indicator boards 183 and 184 supporting the indicator LEDs 69 can be located. These positions 88, 89 therefore include an aperture through the respective face of the shelf enclosure 47 such that indicator LEDs 69 mounted onto a circuit board attached to the inside of the shelf enclosure 47 may be viewed from outside the shelf enclosure.

There now follows are more detailed description of the midplane 171.

As mentioned above, the midplane 171 connects all the elements of a shelf together, including, in the present example, up to sixteen information processing cartridges 43, up to two CSSPs 71, two PSUs 81 and the two indicator boards 183 and 184. In the present example, due to its location within the shelf enclosure, the midplane 171 is not configured to be swappable. Accordingly, to maximize the system reliability, the midplane is configured to provide as a high level of reliability as possible. To this end, the midplane is advantageously configured without active devices and to include the minimum number of decoupling capacitors consistent with good design practice (ideally zero).

The midplane supports a number of paths for various power and signal lines to interconnect the FRUs.

In the present example, each information processing cartridge 43 has a high speed information signal connection (e.g., a Gigabit (Gb) Ethernet SERializer/DESerializer (SERDES) connection) to each of the CSSPs 71, each connection consisting of two pairs of differential signals. In a conventional manner therefore, the tracking of the paths for these signals is arranged to keep the pairs well balanced and on a single signal layer (i.e. without vias) to support such differential signals at high frequency.

In addition, in the present example, each information processing cartridge 43 has a serial console connection to the CSSP cartridge 71. Each connection consists of two TTL (Transistor-Transistor Logic) level signals that make a transmit and return (TX and RX) pair.

Also, each PSU 81 has a management signal connection (e.g., a serial I2C (Inter-IC Bus) connection) to the CSSP cartridge 71 to control power and monitor environmental parameters. The I2C bus comprises of two signals SCL and SDL (serial clock line and serial data line). In addition, an I2C address programming pin is provided for the PSUs 81.

Each information processing cartridge 43 and PSU 81 can signal to the CSSP cartridge 71 that it is inserted by pulling to ground (GND) a respective Inserted_L signal (i.e., an active low signal). These signals are fed to the CSSP cartridge 71 via the midplane 171.

Each PSU 81 has five 12 Volt output rails. The routing from each PSU 81 is arranged so that a fault in any single FRU cannot completely interrupt the power to any other.

As mentioned above, the midplane 171 is provided with appropriate connector arrangements for receiving the connectors on the FRUs.

In the present example, each information processing cartridge 43 connects to the midplane 171 through a 40 pin Single Connector Attachment (SCA-2) connector as defined by the Small Computer Systems Interface (SCSI) standard. Accordingly, the midplane carries corresponding connectors 175.

In the present example, each CSSP cartridge 71 connects to the midplane 171 through a two right-angle 20 pair connector (e.g., 2 mm HM-Zd connectors available from Tyco Electronics). The corresponding connectors 177 on the midplane are straight male parts with a power connector. A guide pin arrangement is provided in addition to the connectors to prevent misaligned modules causing bent pins during insertion. The guide pin also provides a leading ground. The CSSP cartridge 71 also connects to the midplane 171 through a right-angled 125 way 5 row 2 mm connector. The connector 177 on the midplane 171 includes a straight male part. A guide pin arrangement is provided in addition to the connectors to prevent misaligned modules causing bent pins during insertion.

In the present example, as mentioned above, each PSU 81 connects to the midplane 171 through an SSI-MPS specification connector. The contacts are configured 5P/24S/6P with sequenced signal (S) and power (P) pins. Where the connector on the PSU is a 1450230-1 R/A male header, solder tails connector, the mating connector 179 on the midplane can be a 1450540-2 vertical receptacle, press-fit connector.

In the present implementation, indicator boards 183 and 184 (see FIG. 8A) are provided at the front and rear of the system and are configured as FRUs. In this example they hold three system-level indicator LEDs 69 and include a FRU identity (FRU-ID) programmable read-only memory (PROM) each. Three LEDs 69 are present on the indicator board. There can, for example, be a white locator LED that can be switched by the user for locating the system; a green power-on LED to indicate when the system is powered; and an amber service-required LED to indicate a fault or other condition requiring servicing. These LEDs can be driven by the CSSP 71.

In the present example, identification information (FRU ID) for the midplane 171 is held on an I2C electrically erasable programmable read only memory (EEPROM) in the front indicator board 183. In addition to the I2C signals necessary to access the FRU ID EEPROM, the CSSPs 71 provide a current limited supply to the indicator boards 183 and 184 via the midplane. The indicator boards 183 and 184 are also provided with an I2C address programming pin. Depending on the implementation, FRU ID information can be stored instead, or in addition, on the rear indicator board 184.

As the FRU-ID for the midplane 171 is held on one or both of the indicator boards 183 and 184, the midplane can be a totally passive unit. The FRU-ID PROMs communicate with the CSSPs 71 via an I2C bus. Each device on the bus has a separate I2C address. The lower three I2C address bits of the EEPROMs used are available as pins on the device, to allow programming with resistors. The least significant bit of this address (A0) is passed to the midplane via the corresponding connector. This allows the midplane 171 to program the address of the FRU-ID differently for the front and rear indicator boards 183 and 184, by pulling the address low for the front board and high for the rear indicator board 183. This ensures that both EEPROMS are available on the bus, at different addresses. The FRU-ID for the midplane can be stored on either front or rear EEPROM, but the present example the FRU-ID is stored in the EEPROM on the front indicator board 183. The EEPROM can be 8 kByte or larger.

As mentioned above, the midplane 171 includes openings 185 to provide a ventilation path for cooling air passing through the shelf 41. The cooling air passing through the shelf 41 via the midplane 171 can be driven by means of fans provided in each of the information processing cartridges 43 and the power supply modules 81. The openings 185 shown in FIGS. 8B, 9A, 9B and 9C form schematic representations of openings in the midplane 171. In practice, the openings could have any form (i.e., a series of large openings, or a number of small perforations), arranged on the midplane to align with corresponding openings or ventilation apertures in the various field replaceable units 43, 71 and 81. In this way, the path of the airflow from the front of the shelf to the back of the shelf can be configured to be as efficient as possible, depending on the detail configuration of the fan units and the ventilation openings or apertures in the information processing, switch, service processor and power supply unit modules 43, 71 and 81. Providing the fan units in the field replaceable units 43, 71 and 81, contributes to the aim of maintaining the chassis 49 and the midplane 171 of the shelf 41 free of active components, thereby minimising cost, and facilitating maintenance. Also, by providing the fan units in each of the field replaceable units, merely inserting and removing field replaceable units automatically adapts the flow of cooling air to the number and type of field replaceable units inserted in the shelf 41.

As described above, in the present example each of the FRUs is designed to be a non-user serviceable unit. Thus each FRU presents the user with a "sealed" unit which may be inserted into and removed from the shelf 41 as desired or required. If a FRU ceases to be operable, then the user has a choice only of returning the FRU to a supplier or service company for repair or of discarding the non-operable unit. As the FRUs are non-user serviceable, there is no requirement for a skilled technician to be employed in inserting or removing the FRUs into or from a shelf 41. Thus each FRU is designed such that a non-skilled person should have difficulty in causing damage to the FRU during handling. Moreover, the configuration and construction of the FRUs (e.g., provision of injector/ejector levers, grooves in the enclosures of the information processing units, etc), of the shelf enclosure and the midplane (e.g., the guide rails to guide insertion of the FRUs, the locating pins, etc) contribute to facilitating easy insertion and removal of the FRUs.

Thus the general structure and arrangement of a computer system shelf 41 and the FRUs which it is operable to receive can be understood. As the skilled addressee will appreciate, particularly with reference to FIG. 1 above, a plurality of computer system shelves 41 may be utilised in combination to provide a large distributed processing system, for example a server farm such as a web farm.

Figure 5:
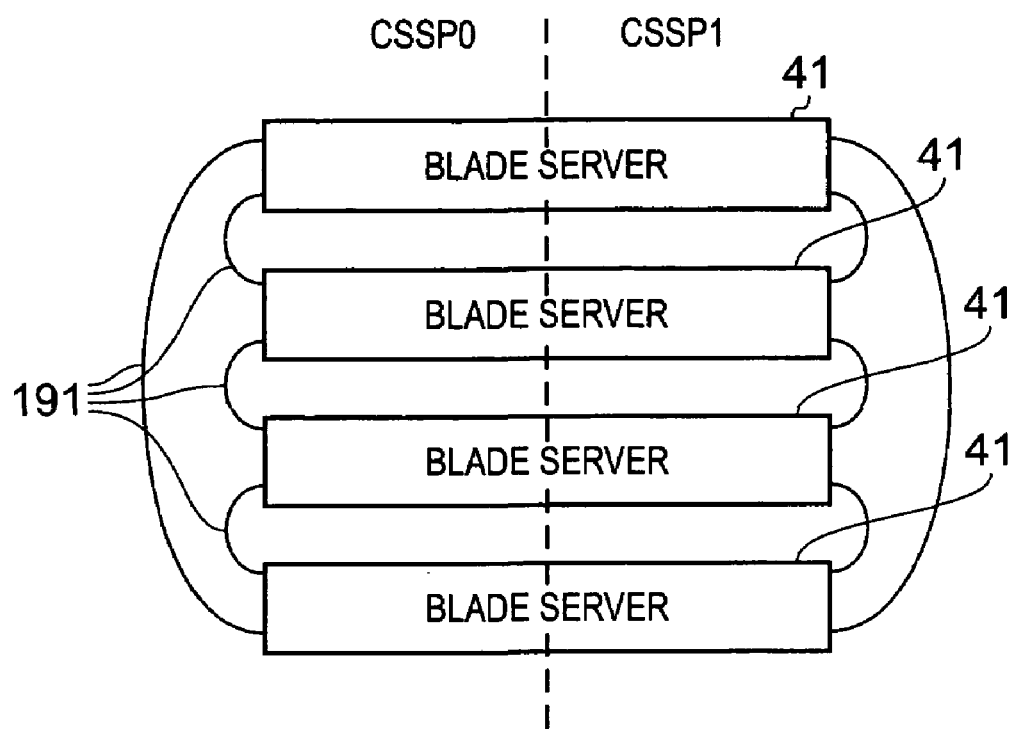
FIG. 5 is a schematic view of an interconnection arrangement for a plurality of shelves of FIG. 2.

In the present example, the CSSP 71 is operable to provide flexible, high bandwidth, highly configurable interconnections between computer system shelves 41. FIG. 5 shows an example of how a plurality of computer system shelves may be interconnected in a logical stacking arrangement using the interconnections facilities provided by the CSSP 71.

In FIG. 5, there are shown a plurality of computer system shelves 41. Each shelf is schematically divided into two, with each half representing the connections of one of the two (dual redundant) CSSPs 71 received in each shelf. As can be seen from the figure, each shelf is connected to two others in a loop by inter-shelf interconnects 191. In the present example, these interconnects 191 are HiGig™ interconnects. HiGig™ is a proprietary technology developed by Broadcom Corporation which is based on 10 Gb-Ethernet technology.

Using the connection topology shown in FIG. 5, it is clear that there are two routes between any two points on each of the networks, allowing any single device or connection on the network to fail without affecting the operation of the other members of the network. In addition, the provision of dual CSSPs 71 in each shelf 41 provides for total duplication of the network connections between the shelves. Thus the shelves 41 in a stack according to the present example are connected together such that a single failure in each of the two networks connecting the shelves does not destroy the integrity of the remainder of the stack. Thus up to two failures within the stack can be tolerated provided that no more than one failure occurs within each loop.

As will be appreciated, providing the level of redundancy described with reference to FIG. 5 (that is dual redundancy within each shelf as to switching and dual redundancy in the stack network connections) may be more capable than a user only requiring a lower level of fault tolerance needs. Thus an alternative stack connection topology is proposed in FIG. 6.

Figure 6:
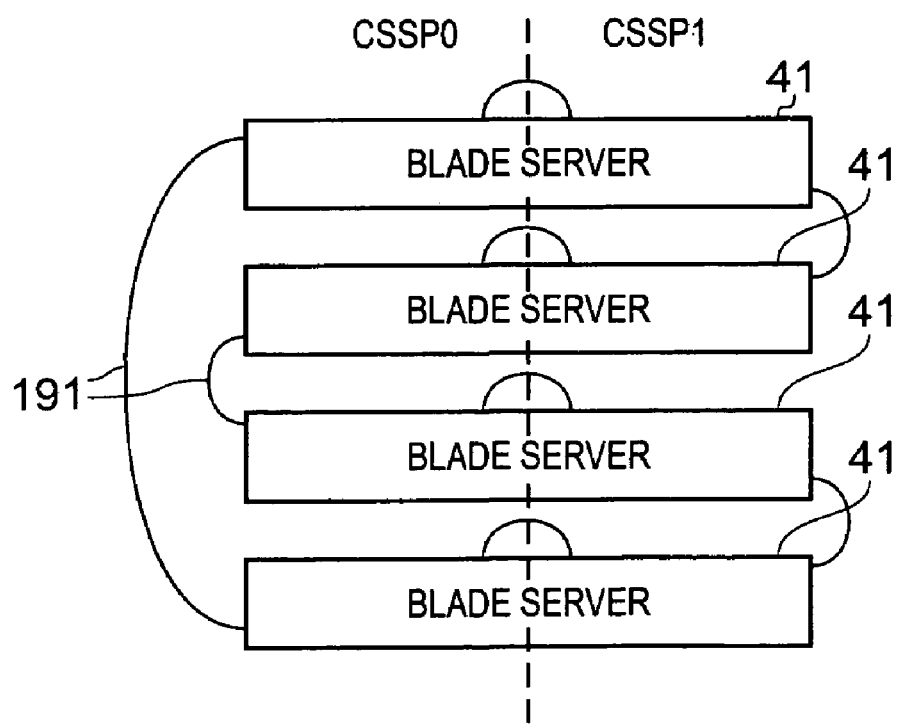
FIG. 6 is a schematic view of an interconnection arrangement for a plurality of shelves of FIG. 2.

In the topology shown in FIG. 6, the shelves 41 are connected by interconnections 191 to form a single loop incorporating both CSSPs 71 of each shelf within the single loop. Thus this arrangement provides tolerance to a single failure within the stack, i.e. the failure of one CSSP 71 or interconnect 191.

Figure 7:
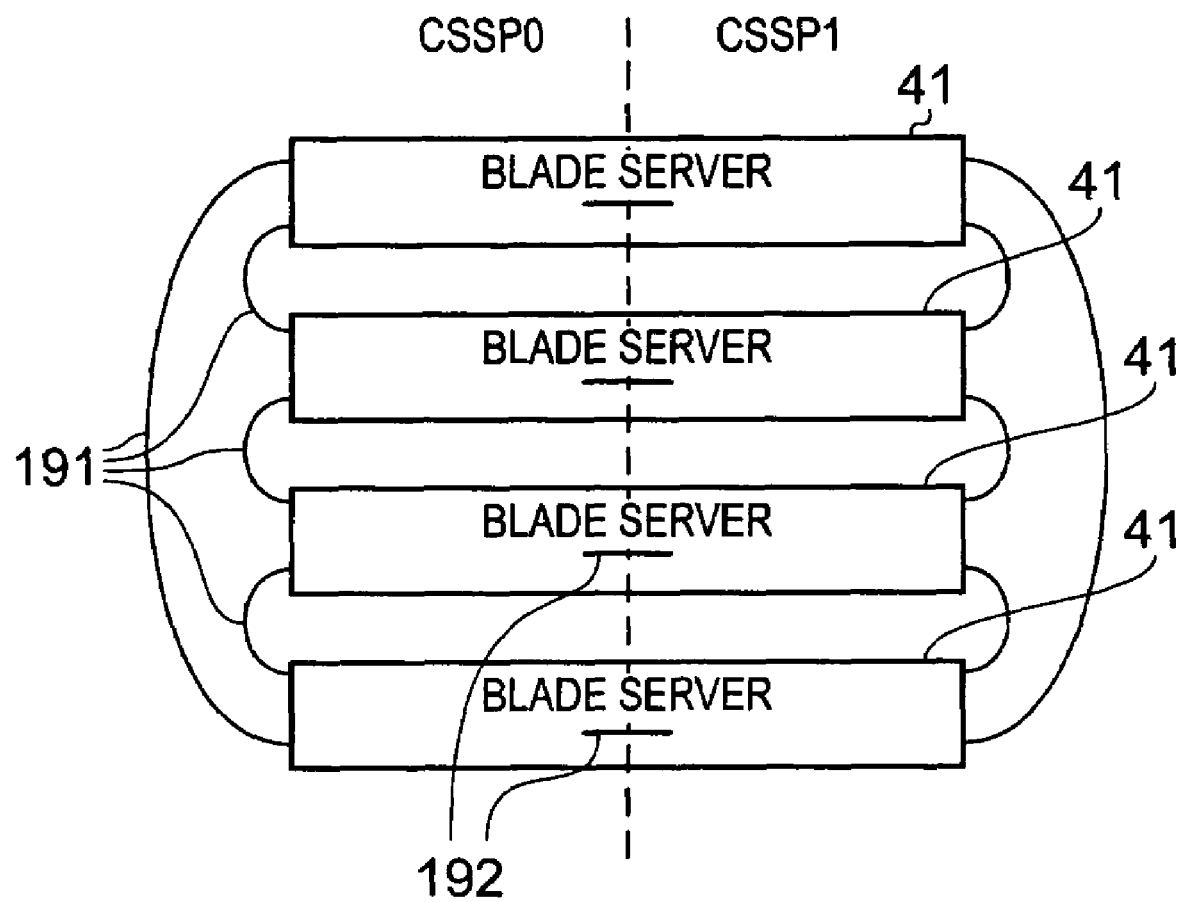
FIG. 7 is a schematic view of an interconnection arrangement for a plurality of shelves of FIG. 2.

In FIG. 7 is shown a further alternative topology for connecting the shelves 41 within a stack. In this example, each CSSP 71 of each shelf 41 is connected to two others as in the example of FIG. 5. In this example, the CSSPs 71 of each shelf 71 are interconnected by inter-CSSP connections 192. The connections 192 of the present example are HiGig™ connections and are routed through the midplane 171 of the shelf 41. By providing this arrangement, the stack becomes tolerant to any two failures within the stack without compromising stack integrity. In alternative arrangements, the connections through the midplane may be Ethernet-connections.

In the above stack arrangements, the CSSPs within each stack can be configured to operate in a master/slaves relationship. Thus a particular CSSP within each stack (each "side" of the stack in the case of FIGS. 5 and 7) is designated as master, with all of the other CSSPs of the stack (or "side") behaving as slaves to the master. The master CSSP is then the controlling switch for the stack (or "side"). Selection of the master CSSP may be performed by external configuration (commanded from a management network connected to at least one of the CSSPs), by predetermined hardware settings (a CSSP may be preconfigured to always act as a master) or by voting between all CSSPs in a stack.

As the skilled addressee will appreciate, the topologies shown in FIGS. 5, 6 and 7 are examples only and many other arrangements are possible. In particular, it is not necessary in the arrangements of FIGS. 5 and 7 (and other similar arrangements) that the connection pattern between CSSPs on one "side" of the stack is identical to the connection pattern on the other "side" of the stack. Also, a stack may comprise any number of shelves 41, provided that at least two are present (the minimum number required to form a stack). In addition, connection formats other than HiGig™ may be employed, for example 10 Gb Ethernet or 1 Gb Ethernet, either singly or grouped.

Figure 8:
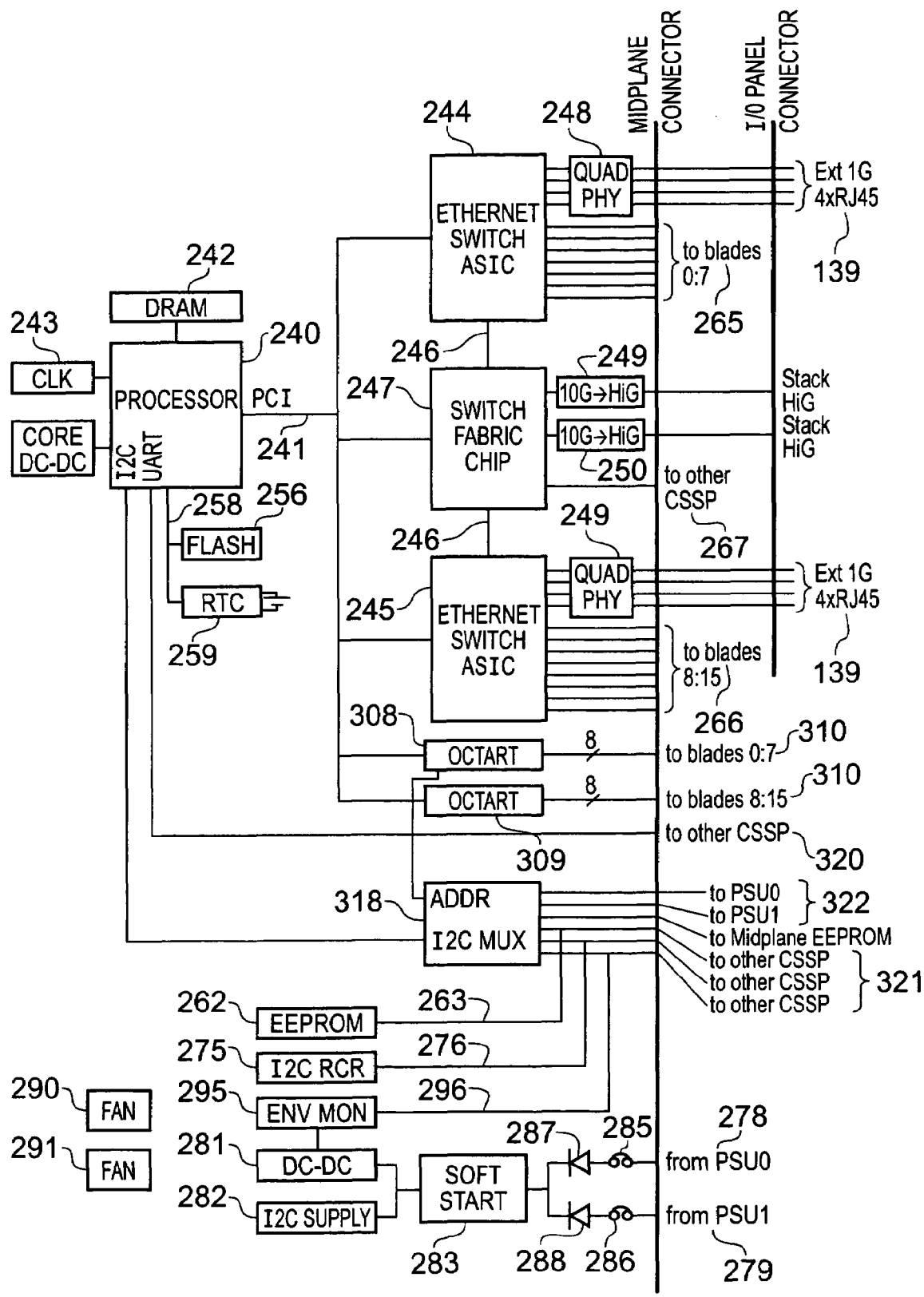
FIG. 8 is a functional block diagram of an example of an information processing subsystem for the combined switch and service processor module for the shelf of FIG. 2.

With reference to FIG. 8, there now follows a description of an example of a combined switch and service processor (CSSP) 71 operable to be connected into a stacked configuration. In the present example, each CSSP 71 provides the functionality of a Switch and of a Shelf Service Processor 74.

There now follows, with reference to FIG. 8, a description of the functional elements of a CSSP 71 as contained within a CSSP enclosure 121 receivable within a shelf enclosure.

FIG. 8 provides an overview of the functional components of the CSSP 71. In the present example, the two functions are provided by common components mounted to a single circuit board. It will be appreciated that such component arrangements are not compulsory for successful operation and that any other component arrangement over any number of component boards can be easily achieved using conventional component arrangement techniques.

The midplane connector 141 on the CSSP 71 establishes the connection between the CSSP 71 and the midplane 171. In the present example, it supports up to 84 connections (pins) that will deliver SerDes Ethernet outputs 265–267, I2C signals 310, 321 and 322, and power 278, 279. Signal connections may be made through two 20-pair right-angled connectors. Power connections may be made through a right-angled connector. The connector can be configured to facilitate hotswapping of the board, for example with a low insertion force. The connector also uses guide pins to increase the ease of serviceability and prevent module misalignment during insertion.

A switch microprocessor 240 is provided, in the present example the microprocessor used is a PowerPC™ (MPC8245) packaged in a 352 pin Tape Ball Grid Array (TBGA) package. This microprocessor 240 supports between 1 MB and 2 GB of address space in the present example. It further includes an Embedded Programmable Interrupt Controller (EPIC) that provides 5 hardware interrupts (IRQs) or 16 serial interrupts. There are 4 programmable timers with cascade mode function. DRAM memory for the processor can provided in the present example by a commodity DIMM 242. The processor 240 can be connected to a 32 bit PCI bus 241, which operates at, for example, 33 MHz/66 MHz.

A clock input to the processor 240 can be provided by a clock generator (CLK) 243. The CLK 243 can include a configurable clock generator (not shown) implemented as a programmable clock synthesiser employing a crystal used to produce CPU clock signals. The clock frequency can be determined by jumper settings (not shown). A configurable core voltage regulator module (VRM) (not shown) can be provided A Flash PROM 256 can store a real time operating system, and management and configuration data for the microprocessor. The Flash PROM 256 in the present example can be operable to hold 8 MB–16 MB of data, depending on the software required. The flash PROM 256 can be operated via an on-chip XBus 258.

Also connected to communicate with the processor 240 via the XBus 258, a Real Time Clock (RTC) 259 can be provided for real-time functions with a back-up battery.

In the present embodiment two Ethernet switch ASICs (application specific integrated circuits) 244, 245 are provided (in the present example, BCM5690 Gigabit switch ASICs). The ASICs 244, 245 of the present example comprise integrated SerDes (serialiser/deserialiser) functionality. Each ASIC can provide twelve GMII Interfaces (1 Gigabit Ethernet) (for uplinks and downlinks) and one 10 Gb XGMII interface for chip-to-chip communication (bridging) 246 between the ASICs 244 and 245. Sixteen GMII 1 Gb 'downlinks', in the form of serialised Gb Ethernet data, are provided to allow each information processing cartridge 43 to communicate with the switch 73. Eight GMII 1 Gb 'uplinks' are provided for external communication through two quad PHYs 48 and 249 (in the present example BCM5404 ASICs) and RJ45 connectors on the rear panel 122. The RJ-45 connectors used in the present example have integrated LED indicators and magnetics. The ASICs 244 and 245 are configured via a PCI interface (32 bit/33 MHz) to the PCI bus 241.

Also provided is a single Switch Fabric Chip 247 (in the present example a BCM5671 Switch Fabric). The switch fabric chip 247 of the present example can provide eight 10 Gb XGMII interface ports. Of these eight interface ports, five are used in the present example. Two ports are used for communication between the Switch fabric chip 247 and the Ethernet Switch ASICs 244, 245 via the bridging 246. Two more 10 Gb ports provide the HiGig™ 'stack uplinks' for external communication via the stack through 10 Gb to HiGig™ interface ICs 249, 250 and 10GCX4 connectors on the rear panel 122. One port provides a 10 Gb 'crosslink' 267 for reliable communication with the other CSSP received within the shelf 41 via the midplane.

Thus data connections to the information processing cartridges, stack connections, external 'uplink' connections and inter-CSSP connections are provided in the present example of a CSSP by the Ethernet Switch ASICs 244, 245 and the Switch Fabric Chip 247. In the present example, the external 'uplink' 1 Gb Ethernet connections are configurable under software control to provide for data or management connections. Thus each CSSP 71 may be connected to a management network via one or more of the external 1 Gb 'uplinks' (which may be grouped together to be treated as a single multiple of 1 Gb connection). In order to provide maximum flexibility in the utilisation of the 'uplink' connections, all of the 'uplinks' may be connected into a single physical network and the total available bandwidth may be soft-configured into different virtual networks (VLANs). Thus data and management information may flow across a single physical network, but be divided such that the data and management networks appear totally separate from one another. The provision of a connection of this bandwidth provides sufficient capability for software deployment to information processing cartridges to be performed across a management network connection.

An 8 kByte I2C EEPROM 262 can be used to store the FRU-ID of the CSSP and is accessible by each CSSP 71 via a serial bus 263 and the midplane 171. The upper 2 kByte of the EEPROM 262 can be configured to be write protected.

An I2C Redundant Control Register (RCR) 275 can be used to provide an alternate, redundant path for powering-down the CSSP 71 and Shelf Indicator boards 183, 184 mounted at the front 57 and rear 59 panels of the shelf 41. The I2C RCR 275 can be accessible by both CSSPs 71 via a serial bus 276 and the midplane 171. In the present example, a device suitable for use as the RCR 275 is a Phillips PCF8574 IC.

To provide management connections to each of the information processing cartridges of the shelf, Octal UARTs 308 and 309 can be connected between the PCI bus 302 and serial connections 310 at the midplane connector 141. The Octal UARTS 308, 309 can facilitate serial communications between the CSSP 71 and each of the processing cartridges 43.

To facilitate I2C communications between the CSSP 71 and the other CSSP 71 received in the shelf, the midplane 171 and the PSUs 81, a multiplexer 318 can be provided. The multiplexer 318 can have a single I2C connection to the processor 240 and connections, via the midplane connector 141 to both PSUs 81, the midplane 171 and the other CSSP 71.

The processor 301 can also comprise an embedded UART (or at least one channel of an embedded DUART or other 'multi'-UART) to provide a redundant serial link 320 to the SSP 74 of the other CSSP 71. Although it would be possible to implement this link using an external UART, the advantage of using an embedded UART is that the connection to the other CSSP is reliable and therefore likely to be functional. Where the embedded UART link does not use the I2C Multiplexer for communications to the other CSSP, a common mode of failure for both the SSP—SSP I2C links can be avoided, it being assumed that the processor 301 is likely to be functional even if the embedded UART channel is non-functional.

The CSSP 71 can be powered from two, diode commoned, 9V power supply rails 278 and 279. DC/DC converters 281 can be used to provide the voltage levels required by the CSSP 71. The DC/DC converters 281 can be supplied by dual 9V inputs 278, 279, individually fused 285, 286 and then diode commoned 287, 288. A soft start controller 283 can be provided to facilitate hot-insertion. A 5V DC/DC converter (I2C power regulator) 282 can be turned on as soon as the CSSP 71 is fully inserted. A 3.3V DC/DC converter can be turned on when instructed, for example through CSSP service software, by asserting low an appropriate signal (ON_L—not shown). The 3.3V converter can be arranged to turn on a converter for 2.5V, 1.2V, and a processor core voltage rail (Vcore) when the voltages are within an appropriate range.

When the CSSP 71 is inserted the inrush current can be limited, for example to <1 A, and the rate of rise can be configured not to exceed a predetermined value (e.g., 20 A/s) to provide a so-called soft start to facilitate hot-insertion. The intent is to prevent damage to the connectors and to avoid generating noise. A soft start controller 283, which controls a ramping-up of voltage levels, can be enabled when the predetermined signal (Inserted_L signal) is asserted low, this signal is on a short pin in the connector and is connected to ground (GND—not shown) through the midplane 171 until one of the supplies is removed. These circuits can be configured to withstand an overvoltage at their inputs whilst the input they are feeding is not powered, without any leakage to the unpowered circuit. A sense circuit can detect if the voltage has dropped below a threshold, for example 2.0V, as a result of a blown fuse, a power rail going down, etc. The DC/DC converters 281 can be protected against short circuit of their outputs so that no damage occurs.

The I2C regulator 282 can be powered as soon as the CSSP 71 is fully inserted into the midplane 171. This can be facilitated through short pins connected to the soft start controller 283, which controls a ramping-up of voltage levels. The other DC/DC regulators can be turned on, for example by SSP software.

A pair of fans 290, 291 can provide cooling to the CSSP 71. The fans 290, 291 can be configured to run at full speed to prevent overtemperature conditions by minimising the temperature of the internal components and the fan. The speed of the fans 290, 291 can be monitored by the CSSP 71 through an environmental monitor 295. The environmental monitor 295 can be alerted in the event of the fan speed falling below a predetermined value (e.g., 80% of its nominal speed). The fan can provide tachometer outputs to facilitate the measurement of fan speed.

External LED status indicators can be provided, for example with a green power LED, an amber LED for indicating that service is required and a blue LED for indicating that the switch is ready to be removed. LED indicators integrated on stacked RJ45 connectors on the rear face of the CSSP 71 can be arranged, for example, to show green continually when the link is present and flash green when the link is active.

The environmental monitor ENV MON 295 can be provided to maintain operational integrity of the CSSP 71. The ENV MON 295 can include limit values in limit registers and can monitor, for example, temperature within the CSSP enclosure 121, the CSSP power rails, including the 12V, 3V3, Switch Processor Core Voltage, CSSP Processor Core Voltage and the two 9V power feed rails 278, 279 from the midplane 171. The outputs of the DC/DC converters 281 can be fed in to A/D inputs of the ENV MON 295 for Watchdog comparisons to be made to the voltage limits set in the limit registers. As noted above, the ENV MON 295 can also monitor the operating speeds of the fans 290 and 291. The ENV MON 295 can communicate with both CSSPs via an I2C bus 296.

For IO to the midplane 171 shown in FIGS. 3A–C and 4A–C, the midplane connector 141 can include eighteen 1 Gb Ethernet connections 265–267 from the Ethernet Switch Asics 244, 245, the serial connections 310, 321 and 322 and the power connections 278, 279.

Each CSSP 71 can access the I2C devices (FRU-ID EEPROM, I2C RCR, and environmental monitor) of another CSSP received in the same shelf via the I2C bus connections through the midplane 171.

For external IO, rear panel Gb Ethernet connections can be provided from the two Ethernet Switch Asics 244,245 to 2×4 stacked RJ45 connectors 139 (to give 8 uplinks). Each port can be an independent 10/100/1000 BASE-T (auto negotiating) port. The rear panel HiGig™ ports can be provided from 10GCX4 connectors.

In an alternative arrangement, the HiGig™ ports can be provided on a removable transition board received through the rear panel of the CSSP 71. The transition board connects to the 10 G to HiGig™ converters 249 and 250 and provides the rear I/O panel connectors. A number of different transition boards are receivable by the CSSP 71. Each different transition board provides external HiGig™ connectors in a different connector format. The transition board also includes any necessary interface hardware for converting the HiGig™ signals for transmission over the chosen medium. For example, the electrical signals from the 10 G to HiGig™ converters are converted into optical signals in a transition board having external optical fibre connections. Other connectors which can be provided by a transition board are connectors for copper interconnects, including 10GCX4 connectors.

The Power Supply Units (PSUs) 81 can be configured such that when two or more PSUs 81 are connected in parallel in the shelf 41, failure of any one of the paralleled units shall not affect system operation. Moreover, one of the PSUs can be installed or removed from a "live" system with or without input power applied. The outputs can have overcurrent protection.

The PSU can have an I2C interface to provide power supply status via the midplane 171. The PSU can have an internal temperature sensor that reports via the I2C interface. The PSU fan speed can also be monitored and errors are reported via the I2C interface. Overvoltage and overcurrent sensors can also report via the I2C interface.

Figure 9:
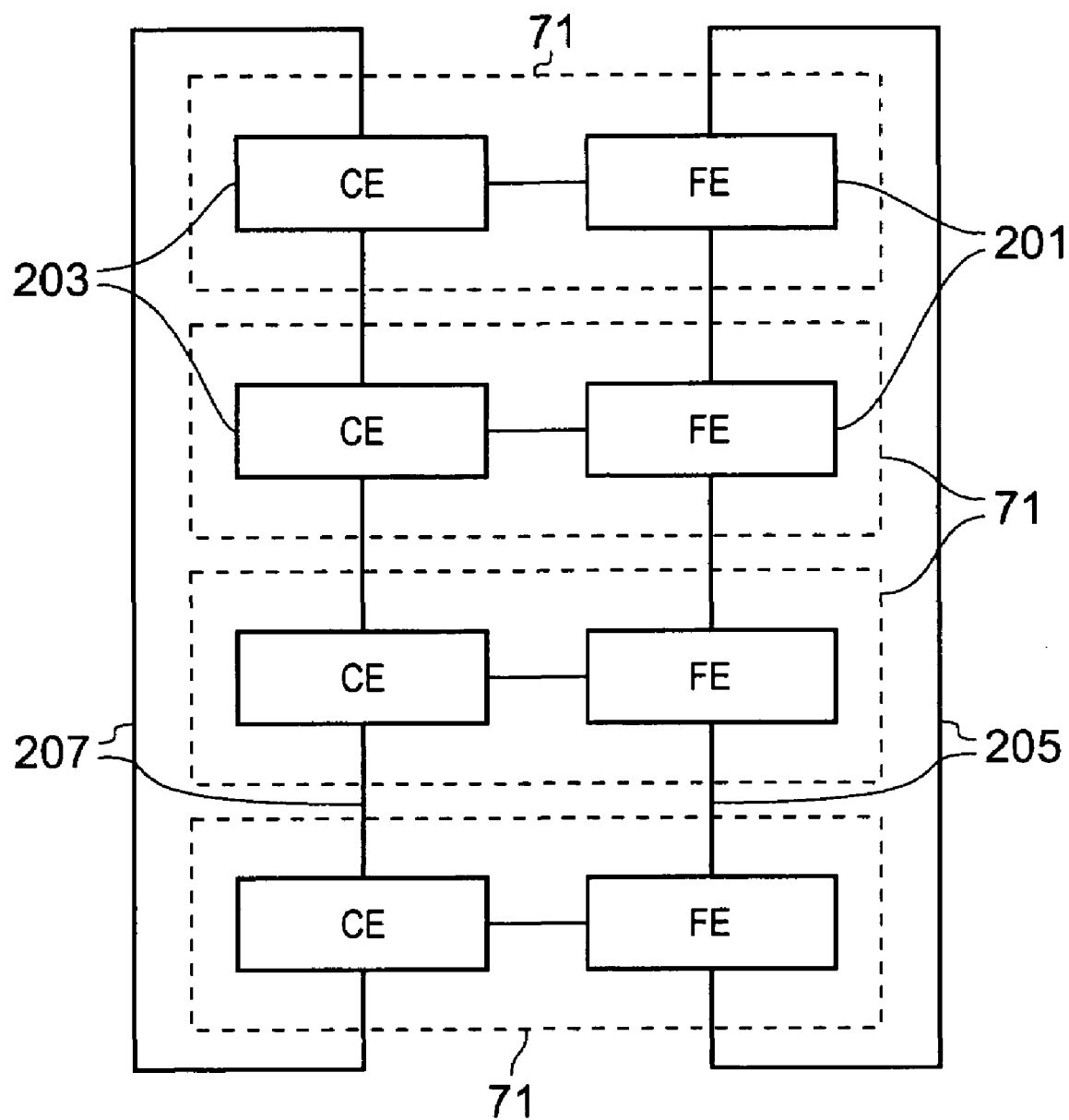
FIG. 9 is a schematic diagram showing an example of the logical elements of part of the combined switch and service processor module for the shelf of FIG. 2.
Figure 10:
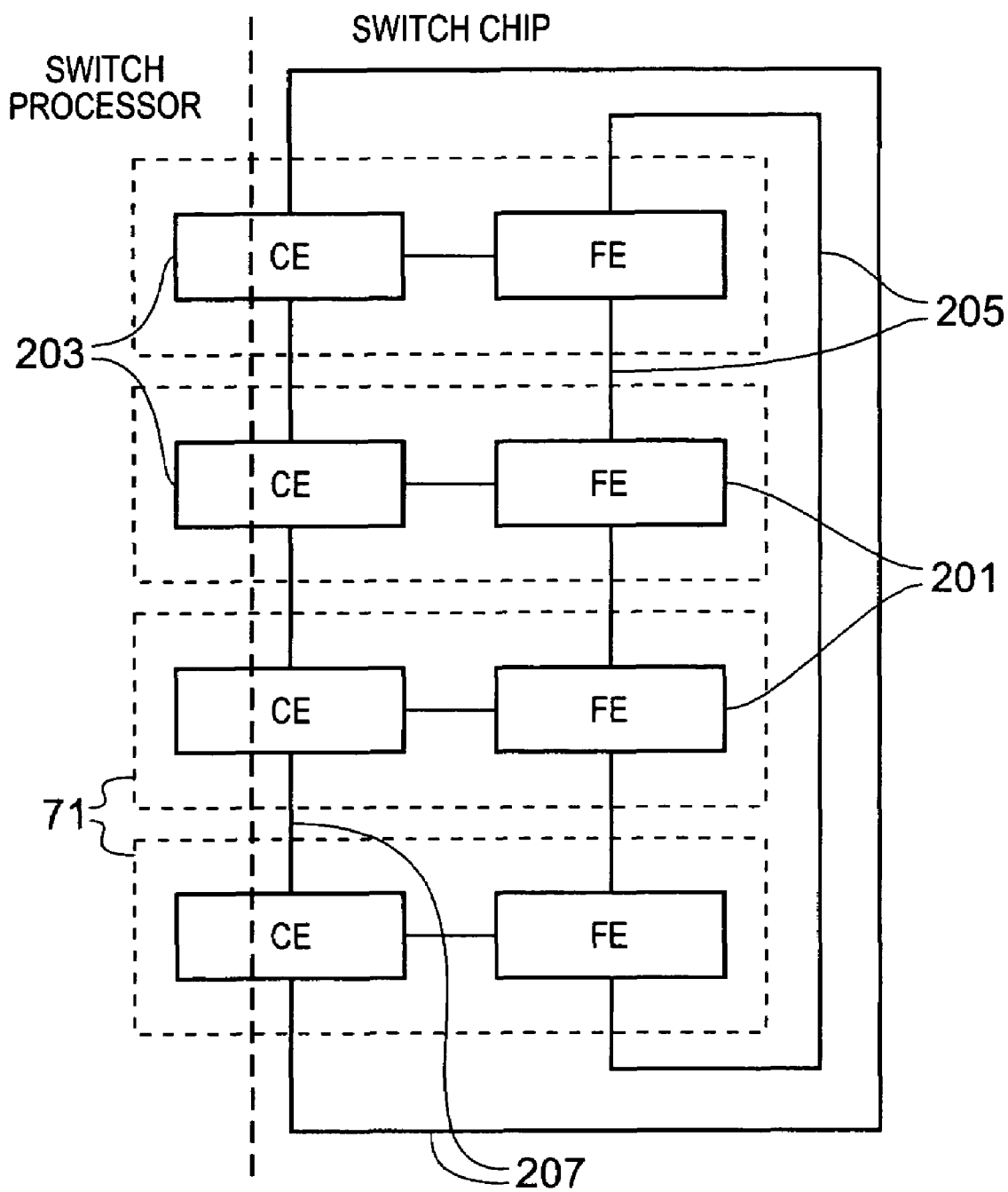
FIG. 10 is a schematic diagram showing the relationship between the logical elements of FIG. 9 and the functional elements of FIG. 8.

Thus there has now been described a modular computer system shelf, an arrangement for interconnecting a plurality of such shelves into a stack and a switching module for the modular computer system operable to be connected according to the interconnection arrangement. With reference to FIGS. 9 and 10 there will now be described the logical connections between the switching modules within the modular computer system shelves arranged in a stack.

FIG. 9 shows the logical components of a switching module such as the CSSP 71 described above relating to the stack connections. Each CSSP 71 can be considered to comprise a forwarding element (FE) 201 and a controlling element (CE) 203. Accordingly, data transferred between shelves in a stack is transferred by the forwarding element 201 via logical data interconnects 205. Similarly, management information transferred between shelves in a stack for the purpose of controlling the stack is transferred by the controlling elements 203 via logical management interconnects 207.

The behaviour of the forwarding element 201 of each CSSP 71 is controlled by its respective controlling element 203. The controlling element 203 is aware of the topography of the stack and thus is able to direct the forwarding element 201 to transmit data around the stack on a shortest-path-to-destination basis. Thus the controlling element comprises tables containing data describing the destination addresses within the stack and in which shelf of the stack each of those destination addresses is located.

Following initial setup of the stack and following any alteration to the destination addresses within the stack (removal of a module from a shelf or insertion of a module into a shelf, for example), management information is transmitted via the logical management interconnects 207 including but not limited to the new arrangement of destination addresses in the stack and data describing the way in which the individual 1 Gb 'uplinks' from each CSSP 71 of each shelf in the stack have been configured. For example, those individual 1 Gb 'uplinks' can be aggregated into a smaller number higher bandwidth uplinks and can also be soft-configured into real or virtual management and data networks. Information on such configurations is can be made available to each CSSP 71 within the stack using the logical management interconnects 207.

Both the logical data interconnects 205 and the logical management interconnects 207 can be implemented using the inter-shelf interconnects 191. Thus all transfer of information between shelves in a stack can take place via the inter-shelf interconnects 191, whether that information is data using the logical data interconnects 205 or management information using the logical management interconnects 207.

FIG. 10 shows how the functionality of the forwarding elements 201 and the controlling elements 203 is provided by the hardware components of the CSSP 71 of the present example.

All of the functionality of the forwarding elements provided within the switch fabric chip 247. That is to say all of the data transfer operations. The switch fabric chip 247 also provides the logical management interconnects 207 between the controlling elements 203. The switch fabric chip 247 can also provide some of the routing control of the controlling element 203. A rules-based filtering or routing facility of the switch fabric chip 247 may be utilised to provide this functionality. The remainder (or all) of the routing control can be provided by the switch processor 240. Thus the CSSP 71 can be configured such that common routing decisions can be dealt with by rules in the switch fabric chip 247 and less common routing decisions can be dealt with by the switch processor 240. Thereby data throughput is maximised and processor loading is minimised.

As the skilled addressee will appreciate, it may not be appropriate or possible to have an unlimited number of shelves 41 in a stack. Reasons for this may include the fact that the bandwidth between shelves in a stack is finite and thus the greater the number of shelves in a stack, the greater the potential latency in transferring data from one part of the stack to another. Also, the connections components may impose limits of their own. For example, the Broadcom HiGig™ components described above with reference to the example of FIG. 8 have a built in limit as to the maximum number of Hi-Gig™ connected components can form a single HiGig™ connection net. Thus it may be desired or necessary to limit the maximum number of shelves in a stack.

Figure 11:
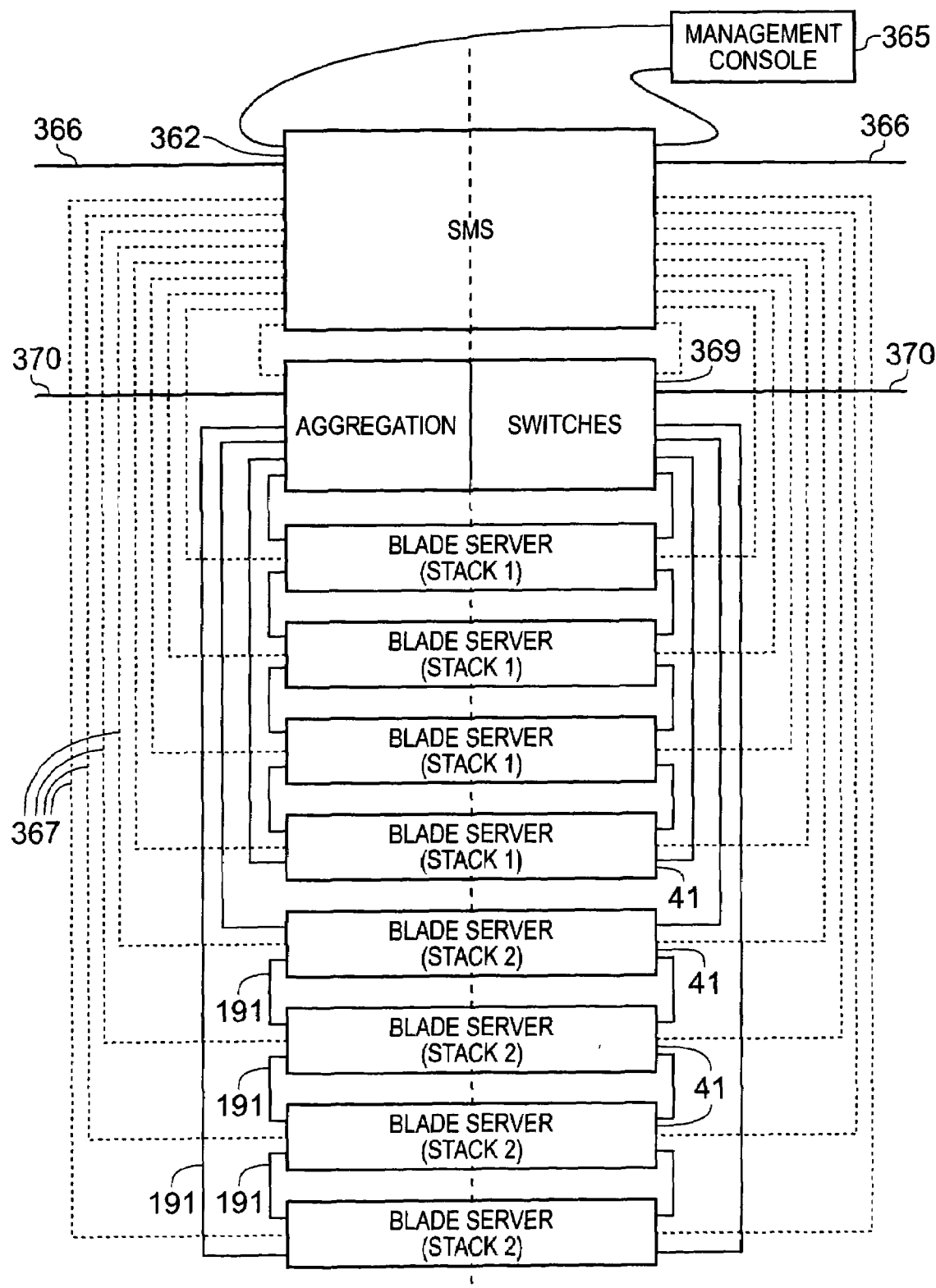
FIG. 11 is a schematic representation of an example of a rack mounted system comprising a plurality of shelves of FIG. 2.

To provide flexibility in the arrangement of shelves within a stack, as well as communications between separate stacks and between stacks and a consumer network, an aggregation switch may be used. An aggregation switch can be the master switch of any or all stacks to which it is connected. FIG. 11 shows an example of how a plurality of stacks may be interconnected and connected to external consumers using an aggregation switch.

Shown in FIG. 11 are a plurality of shelves 41, connected using inter-shelf interconnects 191 into two stacks (STACK 1 and STACK 2). Connected into each stack is an shelf housing a pair of aggregation switches 369. Thus in the present example, each of STACK 1 and STACK 2 each comprise four shelves 41 and a shelf housing the aggregation switches 369. One aggregation switch 369 is provided for each loop ("side") of the stacks, thereby perpetuating the dual redundancy provided in each shelf 41 and in the stack connection arrangement. The shelf housing the aggregation switches 369 can be a specialised shelf for housing aggregation switches. Alternatively the shelf housing the aggregation switches may be a shelf 41 also housing information processing cartridges.

Each aggregation switch 369 also provides a connection 370 to external consumers. In the present example the external consumers can be connected via the Internet, a company Intranet, a local area network or a wide area network. The external consumers can be connected to access any service hosted by any information processing cartridge of any shelf within the STACK 1 or STACK 2 via the aggregation switches 369 and the inter-shelf interconnects 191.

Also shown in FIG. 11 is a System Management Server (SMS) 362. The system management server 362 can be operable to provide system-level management functionality to the shelves in the stacks. In the present example, each shelf 41 is connected to the SMS 362 via a management connection 367. In the present example, at each CSSP 71 this management connection is a 1 Gb Ethernet connection provided from one of the six external 1 Gb Ethernet connections provided at RJ45 connectors 139 on the rear panel of the CSSP.

The SMS 362 also has connections 366 to an external management network 366 and a console connections to a management console 365. The SMS 362 may be duplicated (not shown) to provide dual redundancy in provision of management facilities to the stacks.

Thus it can be seen how multiple stacks may be connected together via an aggregation switch and how such a system may be connected to a management network.

Figure 12:
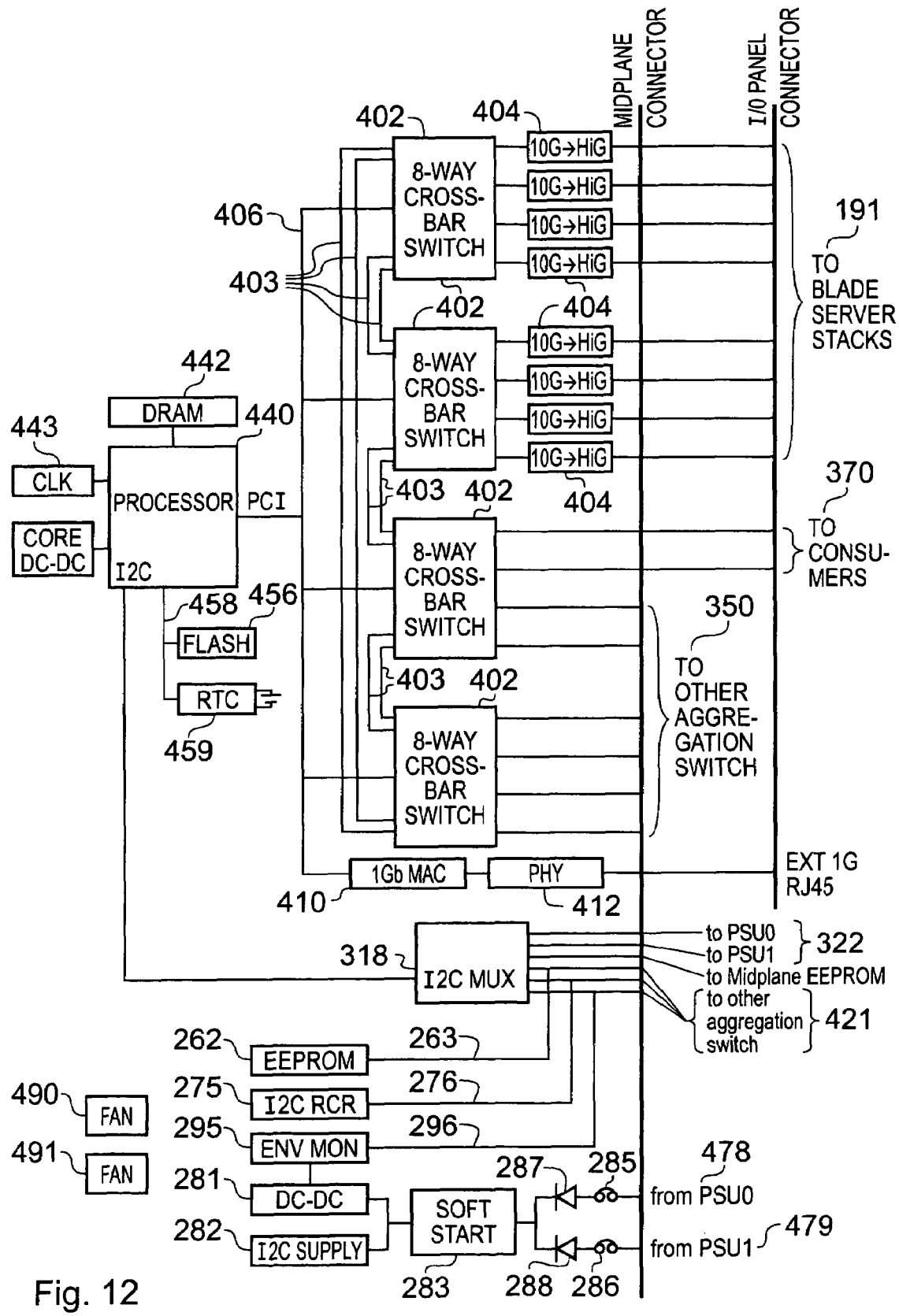
FIG. 12 is a functional block diagram of an example of an information processing subsystem for the aggregation switch of FIG. 11.

Referring now to FIG. 12, there will be described functional components of the aggregation switch 369 of the present example.

In the present example a pair of aggregation switches 369, each configured as Field Replaceable Units (FRUs), are received in a shelf which additionally has a pair of PSUs 81 received therein. Each aggregation switch draws power from each PSU 81 and each of the PSUs 81 is operable independently to fully power both aggregation switches 369. Each aggregation switch 369 of the present example additionally provides a shelf-level management and service function for the PSUs 81 in the shelf.

Each aggregation switch 369 of the present example can comprise a plurality of 8-way crossbar switches 402. Each 8-way crossbar switch 402 comprises eight 10 Gb Ethernet connections. The switches 402 are interconnected so as to produce the effect of a single 16-way crossbar switch, such that sixteen 10 Gb Ethernet connections are available.

In the present example the sixteen 10 Gb Ethernet connections are divided as follows. Four pairs (eight connections) are made available as external inter-shelf interconnects 191 for blade server stacks. Thus four stacks may be connected to the aggregation switch 369. Three pairs (six connections) 350 are used for communication with a second aggregation switch. Thus a pair of aggregation switches 369 mounted into a single shelf may communicate with each other. This facility may provide a number of functions, amongst which is the facility to communicate with a shelf 41 which is only available to one loop ("side") of a stack due to a failure of a CSSP 71 or interconnect 191 within the stack. The final pair of connections 370 provide for communications with external consumers.

The connections 191 to the blade server stacks use the HiGig™ protocol as to the stacking connections of the CSSPs 71 of the shelves of the stacks. Thus 10 G to HiGig™ converters 404 are provided on those connections. The external HiGig™ connections 191 and 10 Gb connections 370 can be directed through 10GCX4connectors on the I/O panel on the exterior of the aggregation switch 369.

The switches 402 are controlled by a processor 440 via a PCI bus 406. Also connected to the PCI bus 406 is a 1 Gb Ethernet MAC 410 for providing a connection from the aggregation switch 369 to a management network. The MAC 410 provides the external connection via an Ethernet PHY 412 and a RJ-45 connector on the connections panel of the aggregation switch.

The controlling processor 440 of the present example is a PowerPC™ processor operating at a clock speed of approximately 400 MHz. As will be appreciated any processor of sufficient processing power to control the required switch functionality may be used. This processor 440 supports between 1 MB and 2 GB of address space in the present example. It further includes an Embedded Programmable Interrupt Controller (EPIC) that provides 5 hardware interrupts (IRQs) or 16serial interrupts. There are four programmable timers with cascade mode function. DRAM memory for the processor can be provided in the present example by a commodity DIMM 442. The processor 440 can be connected to the PCI bus 406 which operates at, for example, 33 MHz/66 MHz.

A clock input to the processor 440 can be provided by a clock generator (CLK) 443. The CLK 443 can include a configurable clock generator (not shown) implemented as a programmable clock synthesiser employing a crystal used to produce CPU clock signals. The clock frequency can be determined by jumper settings (not shown). A configurable core voltage regulator module (VRM) (not shown) can be provided.

A Flash PROM 456 can store a real-time operating system, and management and configuration data for the processor. The Flash PROM 456 in the present example can be operable to hold 8 MB–16 MB of data, depending on the software required. The Flash PROM 456 can be operated via an on-chip Xbus 458.

Also connected to communicate with the processor 440 via the Xbus 458, a Real Time Clock (RTC) can be provided for real-time functions with a back-up battery.

An 8 kByte I2C EEPROM 262 can be used to store the FRU-ID of the CSSP and is accessible by each CSSP 71 via a serial bus 263 and the midplane 171. The upper 2 kByte of the EEPROM 262 can be configured to be write protected.

An I2C Redundant Control Register (RCR) 275 can be used to provide an alternate, redundant path for powering-down the aggregation switch 369 and any Shelf Indicator boards 183, 184 mounted at the front 57 and rear 59 panels of the shelf 41. The I2C RCR 275 can be accessible by both aggregation switches 369 via a serial bus 276 and the midplane 171. In the present example, a device suitable for use as the RCR 275 is a Phillips PCF8574 IC.

To facilitate I2C communications between each aggregation switch 369 and the other aggregation switch 369 received in the shelf, the midplane 171 and the PSUs 81, a multiplexer 318 can be provided. The multiplexer 318 can have a single I2C connection to the processor 240 and connections, via the midplane connector 141 to 25 both PSUs 81, the midplane 171 and the other aggregation switch 369.

The CSSP 71 can be powered from two, diode commoned, 9V power supply rails 478 and 479. DC/DC converters 281 can be used to provide the voltage levels required by the aggregation switch 369. The DC/DC converters 281 can be supplied 30 by dual 9V inputs 278, 279, individually fused 285, 286 and then diode commoned 287, 288. A soft start controller 283 can be provided to facilitate hot-insertion. A 5V DC/DC converter (I2C power regulator) 282 can be turned on as soon as the CSSP 71 is fully inserted. A 3.3V DC/DC converter can be turned on when instructed, for example through CSSP service software, by asserting low an appropriate signal (ON_L-not shown). The 3.3V converter can be arranged to turn on a converter for 2.5V, 1.2V, and a processor core voltage rail (Vcore) when the voltages are within an appropriate range.

When the aggregation switch 369 is inserted the inrush current can be limited, for example to <1 A, and the rate of rise can be configured not to exceed a predetermined value (e.g., 20 A/s) to provide a so-called soft start to facilitate hot-insertion. The intent is to prevent damage to the connectors and to avoid generating noise. A soft start controller 283, which controls a ramping-up of voltage levels, can be enabled when the predetermined signal (Inserted_L signal) is asserted low, this signal is on a short pin in the connector and is connected to ground (GND—not shown) through the midplane 171 until one of the supplies is removed. These circuits can be configured to withstand an overvoltage at their inputs whilst the input they are feeding is not powered, without any leakage to the unpowered circuit. A sense circuit can detect if the voltage has dropped below a threshold, for example 2.0V, as a result of a blown fuse, a power rail going down, etc. The DC/DC converters 281 can be protected against short circuit of their outputs so that no damage occurs.

The I2C regulator 282 can be powered as soon as the aggregation switch 369 is fully inserted into the midplane 171. This can be facilitated through short pins connected to the soft start controller 283, which controls a ramping-up of voltage levels. The other DC/DC regulators can be turned on, for example by SSP software.

A pair of fans 490, 491 can provide cooling to the aggregation switch 369. The fans 490, 491 can be configured to run at full speed to prevent overtemperature conditions by minimising the temperature of the internal components and the fan. The speed of the fans 490, 491 can be monitored by the aggregation switch 369 through an environmental monitor 295. The environmental monitor 295 can be alerted in the event of the fan speed falling below a predetermined value (e.g., 80% of its nominal speed). The fan can provide tachometer outputs to facilitate the measurement of fan speed.

External LED status indicators can be provided, for example with a green power LED, an amber LED for indicating that service is required and a blue LED for indicating that the switch is ready to be removed. LED indicators integrated on networking connectors on the aggregation switch can be arranged, for example, to show green continually when the link is present and flash green when the link is active.

The environmental monitor ENV MON 295 can be provided to maintain operational integrity of the aggregation switch 369. The ENV MON 295 can include limit values in limit registers and can monitor, for example, temperature within the CSSP enclosure 121, the CSSP power rails, including the 12V, 3V3, Switch Processor Core Voltage, CSSP Processor Core Voltage and the two 9V power feed rails 478, 479 from the midplane 171. The outputs of the DC/DC converters 281 can be fed in to A/D inputs of the ENV MON 295 for Watchdog comparisons to be made to the voltage limits set in the limit registers. As noted above, the ENV MON 295 can also monitor the operating speeds of the fans 490 and 491. The ENV MON 295 can communicate with both aggregation switches 369 via an I2C bus 296.

The aggregation switch 369 may also be used to segment a given stack. Thus within a given stack a plurality of independent virtual domains or sub-stacks may be created. Any given domain may include information processing cartridges from one shelf only or from a plurality of shelves and similarly the processing cartridges of a given shelf may be assigned to a single domain or to a plurality of domains. Where such a domain based system is implemented the aggregation switch 369 acts not only as a switch, but also as a router for directing data packets to appropriate domains. The creation and control of such domains is performed by the controlling processor 440 of the aggregation switch 369. A decision to implement a segmentation arrangement may originate from the controlling software of the aggregation switch 369 or from a management network controlling the aggregation switch 369 and the stacks connected thereto. Such a decision may be influenced by measured variables including monitored processor loading of processing cartridges within the stacks and/or by predetermined bandwidth allocations for particular tasks, services or consumers.

Thus there has now been described an arrangement for grouping modular computer systems into stacks having high bandwidth interconnects therebetween, arranged in a redundant fashion to provide fault tolerance. There has also been described a switching module for use in the modular computer systems operable to be used in such a stacked arrangement. In addition there has been described a stack concentrator switch which may be connected into a plurality of stacks to provide interconnections therebetween and connections to consumers external te stacks. An arrangement for using the stack concentrator switch with a plurality of stacks has also been described.

The skilled addressee will appreciate that multitudinous number of adaptations, alterations and substitutions of parts may be made without affecting the operation of the concepts underlying the above described examples. In particular, it will be clear that there is no requirement for the constituent shelves of a given stack to be physically arranged in a stack, it being a logical stack which requires only that the shelves be connected as a stack. Also, a variety of different modular computer system shelves may be provided. Information processing cartridges received in each shelf may be of differing capabilities and functions. For example, specialist load balancing, firewall and/or SSL (Secure Socket Layer) Proxy processing cartridges may be provided in one or more shelves of a stack.

With reference to the aggregation switch described with reference to FIG. 12 above, it will be appreciated that other switch topologies may be utilised without affecting the operation of the switch as an aggregation switch. For example, a greater or lesser number of communications ports may be provided to facilitate a greater or lesser number of stack connections, inter-aggregation switch connections and/or external consumer network connections. For example a single 8-way switch may be used to provide, for example, two stack connection pairs, one inter-aggregation switch connection pair and one external consumer connection pair. Other arrangements may use other combinations of crossbar switches. For example, 4-way switches, 8-way switches, 12-way switches or 16-way switches may be used singly or in combination to provide a desired number of connection ports.

Figure 13:
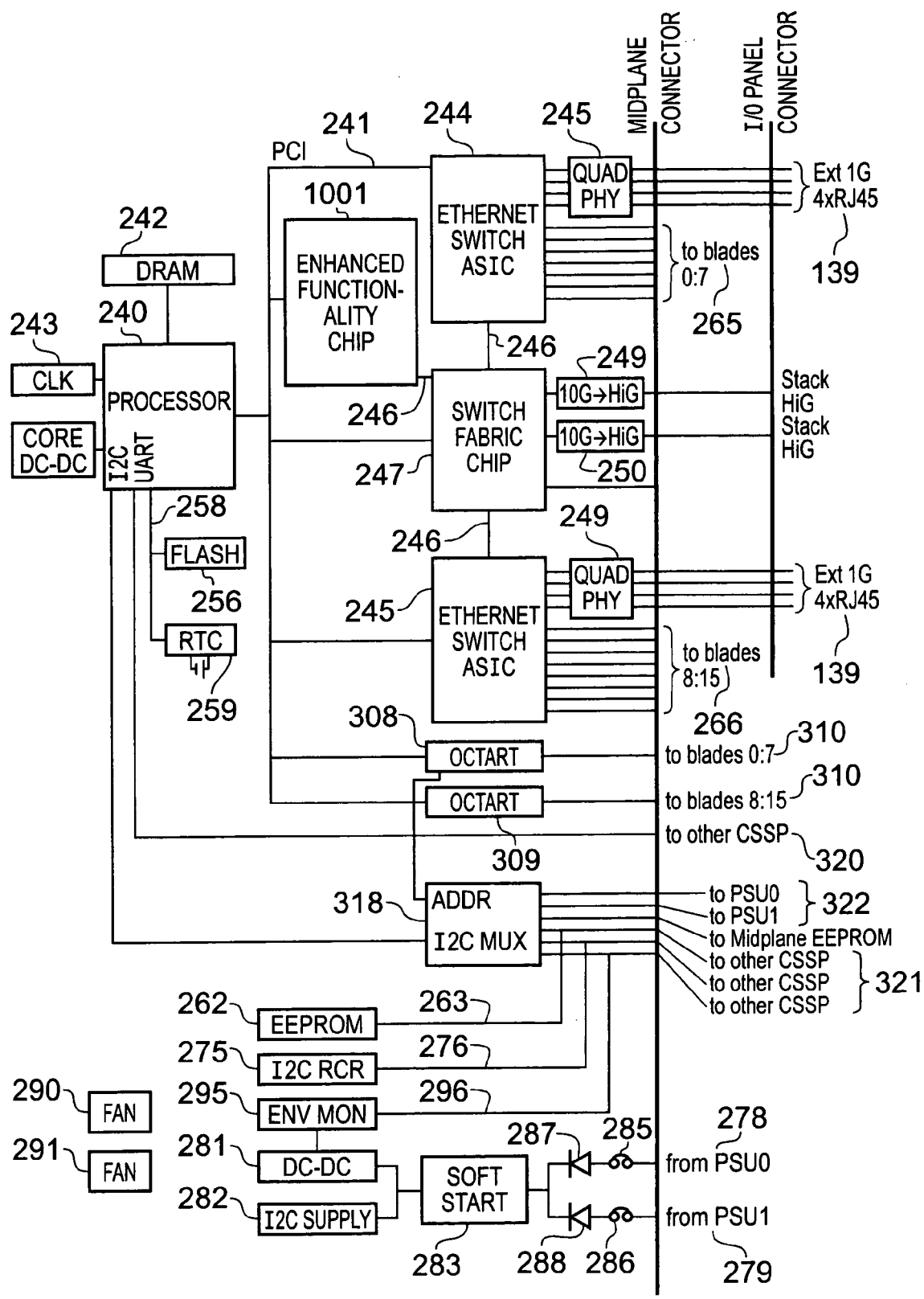
FIG. 13 is a functional block diagram of a further example of an information processing subsystem for the combined switch and service processor module for the shelf of FIG. 2.

FIG. 13 shows an alternative arrangement for a CSSP 71 of a shelf 41. In the CSSP of the present example, all of the features of the CSSP described above with reference to FIG. 8 are maintained and have the same functionality as described above. In addition, there is provided an enhanced functionality chip 1001 attached to the PCI bus 241.

The enhanced functionality chip 1001 of the present example provides "content-aware" functionality to the CSSP. The enhanced functionality chip 1001 is operable to analyse data packets received at the CSSP and provide intelligent switching functions based on such analyses. Thus the CSSP of this example can inspect a data packet and make switching decisions based on the data content. The analysis of the packet contents may be made at one of several different levels. For example, a Layer 2 (L2) switch looks at the MAC (media access control) address and at any VLAN (virtual local area network) ID. A Layer 3 (L3) switch (otherwise known as a router) looks at the Layer 2 information and at the IP (internet protocol) header of the data packet. A Layer 4 (L4) switch looks at TCP (transmission control protocol) and/or UDP (user datagram protocol) ports and thus makes switching decisions at a service level. A Layer 7 (L7) switch looks into the application payload and makes decisions based on the target application of the packet.

In the context of "web-based" services, the provision of which can be the purpose of a modular computer system of the present example, the Layer 4 information (TCP/UDP ports) specifies a service (application protocol) to which the packet relates, for example HTTP (hypertext transfer protocol), HTTPS (secure hypertext transfer protocol) or FTP (file transfer protocol). The Layer 7 information includes a URL (uniform resource locator) which describes a target resource for the packet.

The provision of content-aware packet processing allows the CSSP to perform a number of functions additional to those described above with reference to FIG. 8. Firstly, packet steering may be performed. Packet steering may include directing of HTTPS packets to dedicated encryption engine, such as an SSL Proxy information processing cartridge. Packet steering may also include a load balancing operation, wherein the processing load of a plurality of processing engines (information processing cartridges for example) is monitored, either actively or passively, and new processing tasks are distributed between the processing engines based on their respective determined processing loads.

Also, the content-aware CSSP may perform IP destination address to VLAN mapping, whereby a packet having a destination IP address may be transparently mapped onto a VLAN. Thus the VLAN address is used only within the VLAN and external data transfer may be performed using IP addresses without an-external-party being aware of the existence of the VLAN.

Another function which can be provided in a content-aware CSSP is Packet Filtering. This may allow access control (firewall functions) to be provided at line speed (i.e. without increased latency in the transmission path). The provision of the enhanced functionality chip 1001 allows packet filtering to be performed without intervention form the CSSP processor, thus increasing efficiency of operation. Other functions which may be provided include tier separation (dividing of processing engines providing services associated with different tiers of a computing environment), traffic shaping and metering (monitoring and control network traffic), and QoS (Quality of Service) analysis.

Figure 14:
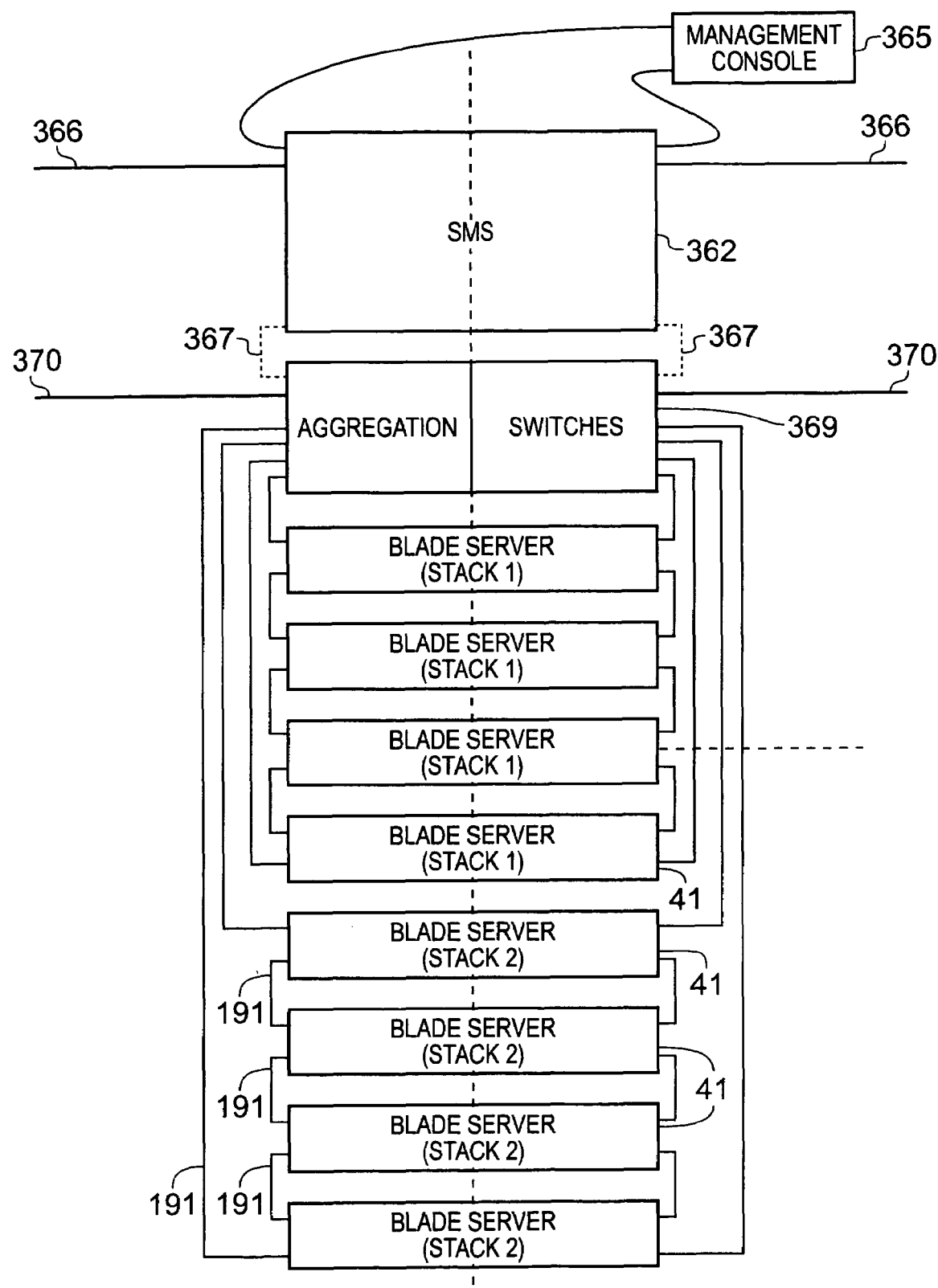
FIG. 14 is a schematic representation of a further example of a rack mounted system comprising a plurality of shelves of FIG. 2.

An alternative arrangement for providing management links to the constituent shelves in a stack is shown in FIG. 14. As with the arrangement shown in FIG. 11 above, a plurality of shelves 41 are connected into two stacks, each stack including the aggregation switches 369. However, in contrast to the arrangement of FIG. 11, there are no individual management links to each shelf 41. Rather, management links are provided between the SMS 362 and the aggregation switches 367 and the management information is multiplexed in with the data content transmitted over the inter-shelf interconnects 191. The management information and data content can be divided between separate Virtual Local Area Networks (VLANs) to provide separation of the two types of information. This arrangement of the present example provides a simplification of cabling relative to the arrangement of the example of FIG. 11, however, there is a potential decrease in performance in the present example. Firstly, as management information is transferred over the inter-shelf interconnects 191, there is a reduction in the bandwidth available to carry data as the total available bandwidth is shared between data and management information. Also, security may be reduced, as data and management information are passing through the same physical channel. Thus it may be easier for malicious data or code transferred in the data pathways to interfere with the operation of the computer systems than if the management and data channels were physically separate. On the other hand, the present example offers a simplified and potentially more cost effective solution where lower data bandwidth and security requirements are lower than that provided in the arrangement of FIG. 11. As the skilled addressee will appreciate, VLANs are an effective way of securely separating two or more information environments communicating over the same physical channel.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during the prosecution of this application or of any such further application derived therefrom. In particular, with reference to the appended claims, features from dependent claims may be combined with those of the independent claims and features from respective independent claims may be combined in any appropriate manner and not merely in the specific combinations enumerated in the claims.

What is claimed is:

1. A computer system comprising:
   a plurality of shelves, each shelf including a carrier configured to removably receive a plurality of information processing modules and two switching modules;
   wherein the shelves are logically connected into a plurality of stacks, wherein the switching modules of the respective shelves in each stack being interconnected in at least one logical stacking configuration; and
   the computer system further comprising a master shelf including a carrier configured to removably receive two master switching modules, wherein each of the master switching modules is connected into each stack as a common master switch for all of the stacks, wherein a first master switching module is connected to a first switching module of a first shelf and to a first switching module of a last shelf in each of the stacks, and wherein a second master switching module is connected to a second switching module of a first shelf and to a second switching module of a last shelf in each of the stacks.

2. The computer system of claim 1, wherein each logical stacking configuration is a closed loop stacking configuration.

3. The computer system of claim 1, wherein each switching module other than the master switching modules is operable as a slave switching module responsive to the corresponding master switching module.

4. The computer system of claim 3, wherein the interconnected switching modules and corresponding master switching module are operable as a single distributed switch.

5. The computer system of claim 1, wherein each of the master switching modules provides a single ingress/egress point for data transfer to/from the computer system.

6. The computer system of claim 1, wherein each shelf includes an interconnection member configured to provide connections between the information processing modules and the switching modules, wherein the information processing modules of each shelf are located at a first side of the interconnections member and the switching modules are located at the second side of the interconnections member and wherein a power supply module for providing power to the modules is removably received in the shelf located at the second side of the interconnections member.

7. The computer system of claim 1, wherein the shelf of the master switching modules has no information processing modules and has a power supply module for providing power to the master switching modules.

8. The computer system of claim 7, wherein the master switching modules are located at a first side of the interconnections member and the power supply module is located at a second side of the interconnections member.

9. The computer system of claim 1, wherein each shelf has two service processing modules removably received therein for providing shelf level service functions to the modules of the shelf.

10. The computer system of claim 9, wherein each of the switching modules of a shelf comprises one of the service processing modules for the shelf.

11. The computer system of claim 9, wherein each of the master switching modules comprises one of service processing modules for its shelf.

12. The computer system of claim 1, wherein both switching modules of each shelf are connected into a common logical stacking arrangement.

13. The computer system of claim 1, wherein each switching module of each shelf is connected into a different logical stacking arrangement to the other switching module of that shelf.

14. The computer system of claim 13, wherein each shelf is connected into two logical stacking arrangements, each switching module of the shelf being connected into a different one of the logical stacking arrangements, and wherein the each logical stacking arrangements provides equivalent connectivity between the shelves as the other logical stacking arrangement.

15. The computer system of claim 1, wherein each switching module of a given shelf is operable to replicate the functionality of the other switching module of that shelf.

16. The computer system of claim 1, wherein one switching module of each shelf is operable as a shelf level master switching module and wherein the other switching module of that shelf is operable as a shelf level slave switching module.

17. The computer system of claim 1, wherein each switching module of a given shelf is interconnected with the other switching module of that shelf.

18. The computer system of claim 17, wherein the inter-switching module interconnection is made through an interconnections member of the shelf.

19. The computer system of claim 1, wherein each switching module of each shelf is connected into a different logical stacking arrangement to the other switching module of that shelf, and wherein each master switching module is connected into a separate one of the logical stacking arrangements.

20. The computer system of claim 1, wherein each master switching module is interconnected with the other master switching module.

21. The computer system of claim 20, wherein the inter-master switching module interconnection is made through an interconnections member of the shelf.

22. The computer system of claim 1, wherein the two master switching are operable in master-slave relationship relative one another.

23. The computer system of claim 1, wherein each switching module comprises at least one forwarding element for performing a forwarding operation and a respective controlling element for controlling the forwarding element.

24. The computer system of claim 23, wherein each switching module comprises at least one switch fabric chip and a controlling microprocessor, and wherein the functionality of each forwarding element is performed by a switch fabric chip and the functionality of the controlling element is performed by the same switch fabric chip and the controlling microprocessor in combination.

25. The computer system of claim 23, wherein each controlling element is aware of the topography of the stack.

26. The computer system of claim 25, wherein each controlling element is operable to control the operation of the forwarding element to cause a unicast data element to be forwarded by its respective forwarding element using a shortest transmission path to its target.

27. The computer system of claim 25, wherein each controlling element is operable to control the operation of the forwarding element to cause a multicast or broadcast data element to be forwarded once around the stack in a given direction.

28. The computer system of claim 23, wherein each switching module is content aware.

29. The computer system of claim 28, wherein the controlling element is operable to study a transmitted data element to determine a path to destination based on the content of that data element.

30. A computer system comprising:
a plurality of shelves, each shelf including a carrier configured to removably receive a plurality of information processing modules and a switching module, and an interconnection member configured to provide connections between the information processing modules and the switching module;
wherein the shelves are logically connected into a plurality of stacks, the switching modules of the respective shelves in each stack being interconnected in a logical stacking configuration, wherein the logical stacking configuration is a closed loop stacking configuration; and
the computer system further comprising a master shelf including a carrier configured to removably receive a master switching module, wherein the master switching module is connected into each stack as a common master switch for all of the stacks;

wherein only a first shelf and a last shelf in each of the plurality of stacks are directly connected to the master switching module.

31. A computer system comprising:

a plurality of shelves, each shelf including a carrier configured to removably receive a plurality of information processing modules and two switching modules, and an interconnection member configured to provide connections between the information processing modules and the switching modules;

wherein the shelves are logically connected into a plurality of stacks, wherein the switching modules of the respective shelves in each stack being interconnected in two separate logical stacking configuration, wherein a first switching module of each shelf is connected into a separate logical stacking arrangement than a second switching module of that shelf; and the computer system further comprising a master shelf including a carrier configured to removably receive two master switching modules, wherein each of the master switching modules is connected into each stack as a common master switch for all of the stacks, wherein a first master switching module is connected to a first switching module of a first shelf and to a first switching module of a last shelf in each of the stacks, and wherein a second master switching module is connected to a second switching module of a first shelf and to a second switching module of a last shelf in each of the stacks.

* * * * *